(12) United States Patent
Senda et al.

(10) Patent No.: US 11,247,231 B2
(45) Date of Patent: Feb. 15, 2022

(54) METHOD FOR FORMING MULTILAYER COATING FILM

(71) Applicant: NIPPON PAINT AUTOMOTIVE COATINGS CO., LTD., Osaka (JP)

(72) Inventors: Akiko Senda, Hirakata (JP); Kenta Takemura, Hirakata (JP); Satoshi Ishida, Tokyo (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 17/267,968

(22) PCT Filed: May 18, 2020

(86) PCT No.: PCT/JP2020/019601
§ 371 (c)(1),
(2) Date: Feb. 11, 2021

(87) PCT Pub. No.: WO2020/241342
PCT Pub. Date: Dec. 3, 2020

(65) Prior Publication Data
US 2021/0245198 A1     Aug. 12, 2021

Related U.S. Application Data

(60) Provisional application No. 62/854,523, filed on May 30, 2019.

(30) Foreign Application Priority Data

Jun. 10, 2019 (JP) .............................. JP2019-108195

(51) Int. Cl.
*B05D 7/00* (2006.01)
*B05D 7/14* (2006.01)

(52) U.S. Cl.
CPC ............... *B05D 7/572* (2013.01); *B05D 7/14* (2013.01); *B05D 2202/10* (2013.01);
(Continued)

(58) Field of Classification Search
CPC ...... B05D 7/572; B05D 7/14; B05D 2202/10; B05D 2320/00; B05D 2420/01;
(Continued)

(56) References Cited

U.S. PATENT DOCUMENTS 4,981,759 A * 1/1991 Nakatani ............... C09D 5/4473
428/626
8,993,673 B2 * 3/2015 Kitagawa ........... C08G 18/6659
524/507

(Continued)

FOREIGN PATENT DOCUMENTS

JP    2003-93965    4/2003
JP    2008-543532   12/2008
(Continued)

OTHER PUBLICATIONS

International Search Report (ISR) dated Jul. 21, 2020 in International (PCT) Application No. PCT/JP2020/019601.

*Primary Examiner* — Dah-Wei D. Yuan
*Assistant Examiner* — Kristen A Dagenais-Englehart
(74) *Attorney, Agent, or Firm* — Wenderoth, Lind & Ponack, L.L.P.

(57) ABSTRACT

The present invention aims to provide a method for forming a multilayer coating film having good coating film smoothness. A method for forming a multilayer coating film, comprising a first aqueous coating composition application step of applying a first aqueous coating composition (A) to form an uncured first aqueous coating film; a second aqueous coating composition application step of applying a second aqueous coating composition (B) onto the uncured
(Continued)

first aqueous coating film to form an uncured second aqueous coating film; a clear coating step of applying a clear coating composition (C) onto the uncured second aqueous coating film to form an uncured clear coating film; and a curing step of heat-curing at once these coating films to form a multilayer coating film, wherein the first aqueous coating composition (A) contains a water-dispersible polyurethane resin (a1) and a viscosity modifier (a2), and the second aqueous coating composition (B) contains water and an organic solvent as diluent components besides solid matters in a state of dilution to a coating viscosity.

7 Claims, 4 Drawing Sheets

(52) U.S. Cl.
CPC ...... *B05D 2320/00* (2013.01); *B05D 2401/21* (2013.01); *B05D 2420/01* (2013.01); *B05D 2420/02* (2013.01); *B05D 2420/03* (2013.01); *B05D 2502/00* (2013.01); *B05D 2503/00* (2013.01)

(58) Field of Classification Search
CPC ............ B05D 2420/02; B05D 2420/03; B05D 2502/00; B05D 2503/00
See application file for complete search history.

(56) References Cited

U.S. PATENT DOCUMENTS

| | | | |
|---|---|---|---|
| 2008/0292802 A1 | 11/2008 | Tonomura et al. | |
| 2013/0089731 A1 | 4/2013 | Imanaka et al. | |
| 2015/0218405 A1* | 8/2015 | Iwata | C09D 133/066 |
| | | | 428/423.1 |
| 2018/0133755 A1 | 5/2018 | Muramoto et al. | |
| 2019/0023938 A1 | 1/2019 | Kurashina et al. | |
| 2020/0038908 A1 | 2/2020 | Homma et al. | |

FOREIGN PATENT DOCUMENTS

| | | |
|---|---|---|
| JP | 2012-116879 | 6/2012 |
| JP | 2013-711 | 1/2013 |
| JP | 2013-535311 | 9/2013 |
| JP | 2013-221041 | 10/2013 |
| JP | 2014-148642 | 8/2014 |
| JP | 2017-170305 | 9/2017 |
| JP | 2018-75552 | 5/2018 |
| JP | 2018-183722 | 11/2018 |

* cited by examiner

OBSERVATION DIRECTION 1

OBSERVATION DIRECTION 2

METHOD FOR FORMING MULTILAYER COATING FILM

TECHNICAL FIELD

The present invention relates to a method for forming a multilayer coating film.

BACKGROUND ART

Basically, the coating of an automobile body or the like is performed by sequentially laminating an electrodeposition coating film, a first coating film, a second coating film, and a clear coating film on a steel plate, which is an article to be coated. In such coating, there are a method of baking and curing each time when each coating film is formed, and a method of simultaneously curing a plurality of laminated coating films. Here, the method of simultaneously curing a plurality of laminated coating films has an advantage that energy saving of coating can be realized because some heat-curing steps can be omitted.

As a method of simultaneously curing a plurality of laminated coating films, a 3-coat 1-bake coating has been implemented in which a first coating film, a second coating film, and a clear coating film are sequentially formed by wet-on-wet and then baked and cured. However, in the conventional 3-coat 1-bake coating, especially the case of using an aqueous coating material requires a preliminary drying step, which is called preheating step, of drying a first aqueous coating composition at 60 to 100° C. for 2 to 20 minutes, for example, after the application thereof. If a second aqueous coating film is formed immediately after an uncured first aqueous coating film is formed, the water and the organic solvent contained in the uncured second aqueous coating film, which is the upper layer, migrates to the uncured first aqueous coating film. When these two coating films are mixed, a mixed layer is formed. The mixed layer deteriorates the appearance of the resulting multilayer coating film.

In recent years, there has been a further demand for reduction of environmental load such as energy saving and reduction of $CO_2$ emission, and it has become desirable to omit the preheating step after forming the uncured first aqueous coating film. On the other hand, the resulting laminated coating film is required to have a good appearance that is not inferior to that of the conventional coating method.

For example, JP-A 2012-116879 (Patent Literature 1) describes an aqueous intermediate coating composition comprising an acrylic resin emulsion (A), a dimer acid derivative aqueous dispersion (B), and a curing agent (C) (claim 1), and a method for forming a multilayer coating film in which the intermediate coating composition, an aqueous base coating composition, and a clear coating composition are sequentially applied by wet-on-wet (claim 3). Further, it is described that in this method for forming a multilayer coating film, preheating is not performed after the uncured intermediate coating film is formed and before the aqueous base coating composition is applied (claim 4). In paragraph [0014] of Patent Literature 1, it is described that the use of the above-mentioned aqueous intermediate coating composition can prevent the occurrence of problems such as mixing of the uncured intermediate coating film and the base coating film.

CITATION LIST

Patent Literature

Patent Literature 1: JP-A-2012-116879

SUMMARY OF INVENTION

Technical Problems

As described in Patent Literature 1, various studies have been conducted on a method for forming a multilayer coating film in which a second coating film is formed without preheating after forming the first coating film. The present invention provides a method for forming a multilayer coating film having good coating film smoothness even when forming a second aqueous coating film without performing preheating after forming a first aqueous coating film.

Solutions to Problems

In order to solve the above-described problems, the present invention provides the following embodiments.

A method for forming a multilayer coating film, comprising:

a first aqueous coating composition application step of applying a first aqueous coating composition (A) to a surface of an article to form an uncured first aqueous coating film, a second aqueous coating composition application step of applying a second aqueous coating composition (B) onto the uncured first aqueous coating film to form an uncured second aqueous coating film, a clear coating step of applying a clear coating composition (C) onto the uncured second aqueous coating film to form an uncured clear coating film, and a curing step of heat-curing at once the uncured first aqueous coating film, the uncured second aqueous coating film, and the uncured clear coating film in the steps defined above to form a multilayer coating film, wherein the first aqueous coating composition (A) comprises a water-dispersible polyurethane resin (a1) and a viscosity modifier (a2), the second aqueous coating composition (B) comprises water and an organic solvent as diluent components besides solid components in a state of dilution to a coating viscosity, and contains, as a part of the organic solvent, an organic solvent having a solubility in water of 0.1% or more and 7% or less, in an amount of 0.4% by mass or more and 5.0% by mass or less per the total amount of the coating material, and also contains an organic solvent insoluble in water in an amount of 0.05% by mass or more and 2.5% by mass or less per the total amount of the coating material, and $M_B$, which is a droplet mass of the second aqueous coating composition (B) at the time of applying the composition to the uncured first aqueous coating film, $V_B$, which is a collision speed, and $\eta_A$, which is a shear viscosity of the uncured first aqueous coating film measured at a shear rate of 10,000 sec$^{-1}$, satisfy the following formula:

$$M_B V_B / \eta_A < 3.0 \times 10^{-7}.$$

The method for forming a multilayer coating film, wherein the second aqueous coating composition (B) is an aqueous coating composition comprising an acrylic resin emulsion and a melamine resin.

The method for forming a multilayer coating film, wherein the organic solvent having a solubility in water of 0.1% or more and 7% or less contained in the second aqueous coating composition (B) is an organic solvent having a boiling point of 160° C. or higher and 280° C. or lower, and the organic solvent insoluble in water is a hydrocarbon-based organic solvent having a boiling point of 145° C. or higher and 200° C. or lower.

The method for forming a multilayer coating film, wherein the shear viscosity $\eta_A$ of the uncured first aqueous coating film is a viscosity $\eta_{A1}$ measured under the conditions of a temperature of 23° C. and a shear rate of 10,000 sec$^{-1}$ at the time of 3 minutes after the first aqueous coating composition (A) is applied under a coating condition such that a dry film thickness of 20 μm is achieved.

The method for forming a multilayer coating film, wherein the first aqueous coating composition (A) comprises the water-dispersible polyurethane resin (a1), the viscosity modifier (a2), a curing agent (a3), and an acrylic resin emulsion (a4).

The method for forming a multilayer coating film, wherein the viscosity modifier (a2) is one or more species selected from the group consisting of a polyamide-based viscosity modifier, a urethane-based viscosity modifier, a polycarboxylic acid-based viscosity modifier, a cellulose-based viscosity modifier, an inorganic layered compound-based viscosity modifier, and an aminoplast-based viscosity modifier.

The method for forming a multilayer coating film, wherein regarding the shear viscosity $\eta_A$ of the uncured first aqueous coating film, the viscosity $\eta_{A1}$ measured under conditions of a temperature of 23° C. and a shear rate of 10,000 sec$^{-1}$ at a time of 3 minutes after applying the composition under a coating condition such that a dry film thickness of 20 μm is achieved, the viscosity $\eta_{A2}$ measured under conditions of a temperature of 23° C. and a shear rate of 10,000 sec$^{-1}$ at a time of 5 minutes after applying the composition under a coating condition such that a dry film thickness of 20 μm is achieved, and the viscosity $\eta_{A3}$ measured under conditions of a temperature of 23° C. and a shear rate of 10,000 sec$^{-1}$ at a time of 7 minutes after applying the composition under a coating condition such that a dry film thickness of 20 μm is achieved satisfy $$M_B V_B / \eta_{A1} < 3.0 \times 10^{-7}$$

$$M_B V_B / \eta_{A2} < 3.0 \times 10^{-7}$$

$$M_B V_B / \eta_{A3} < 3.0 \times 10^{-7}.$$

Advantageous Effects of Invention

By use of the method of the present invention, it is possible to form a multilayer coating film having good coating film smoothness even when forming a second aqueous coating film without performing preheating after forming a first aqueous coating film.

DESCRIPTION OF EMBODIMENTS

Figure 1A:
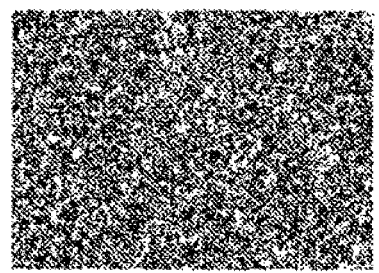
FIG. 1A is a microscope image (observation direction 1) of the horizontal appearance surface of the multilayer coating film formed in Example 1.

The above method for forming a multilayer coating film is a method comprising:

a first aqueous coating composition application step of applying a first aqueous coating composition (A) to the surface of an article to form an uncured first aqueous coating film, a second aqueous coating composition application step of applying a second aqueous coating composition (B) onto the uncured first aqueous coating film to form an uncured second aqueous coating film, a clear coating step of applying a clear coating composition (C) onto the uncured second aqueous coating film to form an uncured clear coating film, and a curing step of heat-curing at once the uncured first aqueous coating film, the uncured second aqueous coating film, and the uncured clear coating film in the steps defined above to form a multilayer coating film. Hereinafter, the coating compositions to be used in the respective steps are described in detail.

The weight-average molecular weight and the number-average molecular weight as referred to herein are values measured in terms of polystyrene standards by gel permeation chromatography (GPC).

First Aqueous Coating Composition

In the above-mentioned method for forming a multilayer coating film, the first aqueous coating composition (A) is used for forming the first aqueous coating film. The first aqueous coating composition (A) comprises a first coating film-forming resin. The first aqueous coating composition (A) comprises a water-dispersible polyurethane resin (a1) as the first coating film-forming resin, and further comprises a viscosity modifier (a2).

First Coating Film-Forming Resin

The first coating film-forming resin comprises a water-dispersible polyurethane resin (a1). The first coating film-forming resin may further comprise other resin components. Examples of other resin components include acrylic resins (acrylic resin emulsion, etc.), curing agents, water-dispersible polyester resins, alkyd resins, and epoxy resins.

Water-Dispersible Polyurethane Resin (a1)

The water-dispersible polyurethane resin (a1) can be prepared using, for example, a polyisocyanate component that contains a diisocyanate as an essential component and may contain another polyisocyanate as an optional component;

a polyol component that contains a polycarbonate diol having a weight-average molecular weight of 1,500 to 5,000 and/or a carboxyl group-containing diol as an essential component and may contain another polyol as an optional component;

an amine component that contains a monoamine compound as an essential component and may contain a diamine compound as an optional component;

a carboxyl group-neutralizing component; and water.

Examples of the form of the water-dispersible polyurethane resin (a1) include emulsion, suspension, colloidal dispersion, and aqueous solution. The particle size in the emulsion, suspension, and colloidal dispersion is not particularly limited. The median size D50 of the particles is preferably 10 nm or more and 1,000 nm or less, more preferably 15 nm or more and 300 nm or less, and even more preferably 15 nm or more and 100 nm or less from the viewpoint that a good dispersed state can be easily maintained. The median size D50 can be measured, for example, by a laser light scattering method.

The diisocyanate contained in the polyisocyanate component is not particularly limited. As the diisocyanate, known diisocyanates may be used singly or two or more of them may be used in combination. As the diisocyanate, an alicyclic diisocyanate is preferable from the viewpoint of hydrolysis resistance of a polyurethane molecule and a coating film to be obtained therefrom. Isophorone diisocyanate, dicyclohexylmethane-4,4'-diisocyanate and the like are more preferable.

The diisocyanate may be used in the form of a modified product such as carbodiimide-modified one, isocyanurate-modified one, or biuret-modified one, or may be used in the form of blocked isocyanate blocked by various blocking agents. The content of the diisocyanate in the polyisocyanate component is preferably 50% by mass or more, and more preferably 70% by mass or more.

The weight-average molecular weight of the polycarbonate diol given as an example of the polyol component is, for example, 1,500 or more and 5,000 or less. Such polycarbonate diols can be prepared, for example, by reacting a polyhydric alcohol (e.g., diol) with dimethyl carbonate. The diol that can be used for the preparation of the polycarbonate diol is not particularly limited. Examples of the diol include low molecular weight diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, and 1,6-hexanediol. Among these, 1,6-hexanediol is preferable because it is inexpensive and easily available.

The carboxyl group-containing diol, which is mentioned as an example of the polyol component, is used in order to introduce hydrophilic groups into a polyurethane molecule. Examples of the carboxyl group-containing diol include dimethylolpropionic acid, dimethylolbutanoic acid, dimethylolbutyric acid, and dimethylolvaleric acid. These carboxyl group-containing diols may be used singly or two or more of them may be used in combination.

Other polyol compounds that may optionally be incorporated as a polyol component are not particularly limited. As the other polyol compound, known polyols may be used singly or two or more of them may be used in combination. Examples of such polyol compounds include low molecular weight polyols, polyether polyols, polybutadiene polyols, silicone polyols, and polyols having an ester linkage.

The composition ratio of the polycarbonate diol having a weight-average molecular weight of 1,500 or more and 5,000 or less in the above-mentioned polyol component is preferably 50% by mass or more and 97% by mass or less, and more preferably 75% by mass or more and 95% by mass or less. The composition ratio of the carboxyl group-containing diol is preferably 3% by mass or more and 30% by mass or less, and more preferably 5% by mass or more and 25% by mass or less. The molar ratio of the polycarbonate diol to the carboxyl group-containing diol (=polycarbonate diol:carboxyl group-containing diol) is preferably 1:0.8 to 1:2, more preferably 1:1 to 1:1.75, and even more preferably 1:1.2 to 1:1.5.

The monoamine compound included in the amine component is not particularly limited. As the monoamine compound, known monoamine compounds may be used singly or two or more of them may be used in combination. Examples of the monoamine compound include alkylamines such as ethylamine, propylamine, 2-propylamine, butylamine, 2-butylamine, tertiary butylamine and isobutylamine; aromatic amines such as aniline, methylaniline, phenylnaphthylamine and naphthylamine; alicyclic amines such as cyclohexaneamine and methylcyclohexaneamine; etheramines such as 2-methoxyethylamine, 3-methoxypropylamine, and 2-(2-methoxyethoxy)ethylamine; and alkanolamines such as ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, and N-ethylethanolamine. Among these, alkanolamines are preferable because they improve the water dispersion stability of polyurethane molecules.

The diamine compound that may optionally be incorporated as the amine component is not particularly limited. As the diamine compound, known diamine compounds may be used singly or two or more of them may be used in combination.

The neutralizing agent to be used as the above-mentioned carboxyl group-neutralizing component is preferably a basic compound. The basic compound undergoes a neutralization reaction with the carboxyl group of the carboxyl group-containing diol to form a hydrophilic salt. Such a basic compound is not particularly limited. Examples of the basic compound include tertiary amine compounds such as trialkylamines (e.g., trimethylamine, triethylamine, and tributylamine), N,N-dialkylalkanolamines (e.g., N,N-dimethylethanolamine, N,N-dimethylpropanolamine, N,N-dipropylethanolamine, and 1-dimethylamino-2-methyl-2-propanol, N-alkyl-N,N-dialkanolamines) and trialkanolamines (e.g., triethanolamine); ammonia; trimethylammonium hydroxide; sodium hydroxide; potassium hydroxide; and lithium hydroxide. Among these, tertiary amine compounds can be particularly preferably used from the viewpoint of dispersion stability, etc.

The water-dispersible polyurethane resin (a1) may be prepared by using an internal branching agent and an internal crosslinking agent together with the above-mentioned components. Internal branching agents and internal crosslinking agents impart branching and/or crosslinking structures to polyurethane molecules.

The method for producing the water-dispersible polyurethane resin (a1) is not particularly limited, and known methods may be applied. Among them, preferred are methods that involve synthesizing a prepolymer or a polymer, and then feeding this to water to disperse. Examples of such methods include a method of synthesizing a prepolymer from a polyisocyanate component and a polyol component and reacting it with an amine component in water, and a method of synthesizing a polymer from a polyisocyanate component, a polyol component and an amine component and feeding it to water to disperse. The carboxyl group-neutralizing component may have been added in advance to the water to be fed, or may be added after the feed.

The synthesis of the prepolymer or the polymer is carried out in a solvent that is inert to the reaction and has a high affinity with water. Examples of the solvent include acetone, methyl ethyl ketone, dioxane, tetrahydrofuran, and N-methyl-2-pyrrolidone. These solvents are usually used in an amount of 3% by mass or more and 100% by mass or less with respect to the total amount of the above-mentioned starting materials to be used for producing the prepolymer.

In the above production method, the blending ratio of the starting materials is not limited unless otherwise specified. The blending ratio of the starting materials may be replaced by the molar ratio of the isocyanate-reactive groups in the polyol component and the amine component to the isocyanate groups in the polyisocyanate component at the reaction stage. The molar ratio of the isocyanate-reactive groups in the polyol component and the amine component to the isocyanate groups in the polyisocyanate component (=isocyanate-reactive groups/isocyanate groups) is preferably 0.5 or more and 2.0 or less. The molar ratio of the isocyanate-reactive groups in the polyol component to the isocyanate groups in the polyisocyanate component (=isocyanate-reactive groups/isocyanate groups) is preferably 0.3 or more and 1.0 or less, and more preferably 0.5 or more and 0.9 or less. The molar ratio of the isocyanate-reactive groups in the amine component to the isocyanate groups in the polyisocyanate component (=isocyanate-reactive groups/isocyanate groups) is preferably 0.1 or more and 1.0 or less, and more preferably 0.2 or more and 0.5 or less.

The neutralization rate attained by the carboxyl group-neutralizing component may be set within a range where sufficient dispersion stability is given to the resulting water-dispersible polyurethane resin (a1).

The water-dispersible polyurethane resin (a1) may contain an emulsifier such as a surfactant singly or two or more species thereof in combination in order to stably disperse in the first aqueous coating composition (A).

As the emulsifier, a known anionic surfactant or nonionic surfactant is preferred in that this improves the dispersibility or emulsifiability of the water-dispersible polyurethane resin (a1) in the first aqueous coating composition (A).

The amount of the emulsifier used is preferably 0.01 or more and 0.3 or less, and more preferably 0.05 or more and 0.2 or less in mass ratio relative to the polyurethane resin (=emulsifier/polyurethane resin). When the mass ratio of the emulsifier is within this range, sufficient dispersibility can be obtained, and physical properties such as water resistance, strength, and elongation of a coating film obtained from the first aqueous coating composition (A) can readily be improved.

From the viewpoint of dispersibility and coating workability, the solid content of the water-dispersible polyurethane resin (a1) is preferably 2% by mass or more and 70% by mass or less, and more preferably 5% by mass or more and 60% by mass or less.

The number-average molecular weight of the polyurethane resin dispersed in the water-dispersible polyurethane resin (a1) is preferably 1,000 or more and 200,000 or less, and more preferably 2,000 or more and 100,000 or less. The hydroxyl value and the acid value of the polyurethane resin are not particularly limited, and any value may be chosen. The hydroxyl value is preferably, for example, 0 mg KOH/g or more and 100 mg KOH/g or less. The acid value is preferably, for example, 1 mg KOH/g or more and 40 mg KOH/g or less, and more preferably 3 mg KOH/g or more and 30 mg KOH/g or less. The hydroxyl value and the acid value are determined based on the resin solid content.

The solid content of the water-dispersible polyurethane resin (a1) contained in the first aqueous coating composition (A) is preferably 3 parts by mass or more and 40 parts by mass or less, and more preferably 10 parts by mass or more and 35 parts by mass or less, per 100 parts by mass of the resin solid content of the first aqueous coating composition (A).

Viscosity Modifier (a2)

The first aqueous coating composition (A) comprises a viscosity modifier (a2). Examples of the viscosity modifier include polyamide-based viscosity modifiers, urethane-based viscosity modifiers, polycarboxylic acid-based viscosity modifiers, cellulose-based viscosity modifiers, inorganic layered compound-based viscosity modifiers, and aminoplast-based viscosity modifiers.

Examples of the polyamide-based viscosity modifier include fatty acid amides, polyamides, acrylic amides, long-chain polyamino amides, amino amide, and salts thereof (e.g., phosphates).

Examples of the urethane-based viscosity modifier include polyether polyol-based urethane prepolymers and urethane-modified polyether type viscosity modifiers.

Examples of the polycarboxylic acid-based viscosity modifier include high molecular weight polycarboxylic acids, high molecular weight unsaturated acid polycarboxylic acids, and partially amidated products thereof.

Examples of the cellulose-based viscosity modifier include cellulose-based viscosity modifiers such as hydroxyethyl cellulose and hydroxypropyl cellulose.

Examples of the inorganic layered compound-based viscosity modifier include layered compounds such as montmorillonite, bentonite, and clay.

Examples of the aminoplast-based viscosity modifier include hydrophobically modified ethoxylate aminoplast-based associated viscosity modifiers.

The viscosity modifiers may be used singly or two or more of them may be used in combination.

As the viscosity modifier, commercially available products thereof may be used. Examples of commercially available viscosity modifiers include:

DISPARLON AQ-600, AQ-607, AQ-620, AQ-630, AQH-800 (produced by Kusumoto Chemicals, Ltd.), Anti-Terra-U (produced by BYK Chemie), Disperbyk-101, Disperbyk-130 (produced by BYK Chemie), which are polyamide-based viscosity modifiers;

Anti-Terra-203/204 (produced by BYK Chemie), Disperbyk-107 (produced by BYK Chemie), BYK-P104, BYK-P105 (produced by BYK Chemie), Primal ASE-60, Primal TT-615 (produced by The Dow Chemical Company), Viscalex HV-30 (produced by BASF), SN-THICKENER 617, SN-THICKENER 618, SN-THICKENER 630, SN-THICKENER 634, SN-THICKENER 636 (produced by San Nopco Ltd.), which are polycarboxylic acid based viscosity modifiers;

ADEKA NOL UH-814N, UH-752, UH-750, UH-420, UH-462 (produced by ADEKA Corp.), SN-THICKENER 621N, SN-THICKENER 623N (produced by San Nopco Ltd.), RHEOLATE 244, 278 (produced by Elementis plc), which are urethane-based viscosity modifiers;

HEC Daicel SP600N (produced by Daicel FineChem Ltd.), which is a cellulose-based viscosity modifier;

BENTONE HD (produced by Elementis Co.), which is a layered compound based viscosity modifier; and Optiflo H 600 VF (produced by BYK Chemie), which is an aminoplast based viscosity modifier.

The viscosity modifier preferably includes one or more species of polycarboxylic acid-based viscosity modifiers and urethane-based viscosity modifiers. More preferably, a polycarboxylic acid-based viscosity modifier is included.

The amount of the viscosity modifier (a2) contained in the first aqueous coating composition (A) is preferably 0.01% by mass or more and 20% by mass or less, more preferably 0.05% by mass or more and 10% by mass or less, and even more preferably 0.5% by mass or more and 5% by mass or less, based on the resin solid mass of the first aqueous coating composition (A).

Curing Agent (a3)

The first aqueous coating composition (A) preferably comprises a curing agent (a3). The curing agent (a3) is a kind of the first coating film-forming resin. Examples of the curing agent (a3) include melamine resin, blocked isocyanate resin, oxazoline compounds, and carbodiimide compounds. These may be used singly, or two or more of them may be used in combination.

The melamine resin is not particularly limited, and those usually used as a curing agent may be used. As the melamine resin, for example, alkyl etherified melamine resins, which have been alkyl etherified, are preferred, and melamine resins substituted with methoxy groups and/or butoxy groups are more preferred. Examples of such melamine resins include those having only methoxy groups, such as CYMEL 325, CYMEL 327, CYMEL 370, and MYCOAT 723; those having both methoxy groups and butoxy groups, such as CYMEL 202, CYMEL 204, CYMEL 211, CYMEL 232, CYMEL 235, CYMEL 236, CYMEL 238, CYMEL 251, CYMEL 254, CYMEL 266, CYMEL 267, and CYMEL 285 (all trade names, manufactured by Nihon Cytec Industries Inc.); and those having only butoxy groups, such as MYCOAT 506 (trade name, manufactured by Mitsui Cytec Ltd.), U-VAN 20N60 and U-VAN 20SE (both trade names, manufactured by Mitsui Chemicals, Inc.). These may be used singly, or two or more of them may be used in combination. Among these, CYMEL 211, CYMEL 251, CYMEL 285, CYMEL 325, CYMEL 327, and MYCOAT 723 are more preferred.

Blocked isocyanate resins are resins obtained by blocking polyisocyanate compounds with appropriate blocking agents. The polyisocyanate compound is not particularly limited as long as it is a compound having two or more isocyanate groups in one molecule. Examples of the polyisocyanate compound include aliphatic diisocyanates such as hexamethylene diisocyanate (HMDI) and trimethylhexamethylene diisocyanate (TMDI); alicyclic diisocyanates such as isophorone diisocyanate (IPDI); aromatic-aliphatic diisocyanates such as xylylene diisocyanate (XDI); aromatic diisocyanates such as tolylene diisocyanate (TDI) and 4,4-diphenylmethane diisocyanate (MDI); hydrogenated diisocyanates such as dimer acid diisocyanate (DDI), hydrogenated TDI (HTDI), hydrogenated XDI (H6XDI) and hydrogenated MDI (H12MDI), and adducts and nurates of the above diisocyanates. These are used singly or two or more of them are used appropriately in combination.

The blocking agent that blocks the polyisocyanate compound is not particularly limited. Examples of the blocking agent include oximes such as methyl ethyl ketoxime, acetoxime, and cyclohexanone oxime; phenols such as m-cresol and xylenol; alcohols such as butanol, 2-ethylhexanol, cyclohexanol, and ethylene glycol monoethyl ether; lactams such as ε-caprolactam; diketones such as diethyl malonate and acetoacetic acid esters; mercaptans such as thiophenol; ureas such as thiouric acid; imidazoles; and carbamic acids. Among these, oximes, phenols, alcohols, lactams, and diketones are preferred.

The oxazoline-based compound is preferably a compound having two or more 2-oxazoline groups. Examples of the oxazoline-based compound include the following oxazolines and oxazoline group-containing polymers. These can be used singly or two or more of them may be used in combination. The oxazoline-based compound is obtained by a method of heating an amide alcohol in the presence of a catalyst to dehydrate and cyclize it, a method of synthesizing it from an alkanolamine and a nitrile, or a method for synthesizing it from an alkanolamine and a carboxylic acid.

Examples of oxazolines include 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane)sulfide, and bis-(2-oxazolinylnorbornane)sulfide. These may be used singly or two or more of them may appropriately be used in combination.

The oxazoline group-containing polymer is obtained by polymerizing an addition-polymerizable oxazoline, or an addition-polymerizable oxazoline and, as necessary, at least one other polymerizable monomer. Examples of the addition-polymerizable oxazoline include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These are used singly or two or more of them are used appropriately in combination. Among them, 2-isopropenyl-2-oxazoline is preferred because of its industrially easy availability.

The amount of the addition-polymerizable oxazoline used is not particularly limited. The amount of the addition-polymerizable oxazoline used is preferably 1% by mass or more in the oxazoline group-containing polymer. When the amount of the addition-polymerizable oxazoline used is in this range, sufficient curing is made, and the durability, water resistance, etc. of a resulting coating film are likely to be improved.

The other polymerizable monomer is not particularly limited as long as it is a monomer copolymerizable with the addition-polymerizable oxazoline and does not react with an oxazoline group. Examples of the other polymerizable monomer include (meth)acrylates such as methyl (meth)acrylate, butyl (meth)acrylate, and 2-ethylhexyl (meth)acrylate; unsaturated nitriles such as (meth)acrylonitrile; unsaturated amides such as (meth)acrylamide and N-methylol (meth)acrylamide; vinyl esters such as vinyl acetate and vinyl propionate; vinyl ethers such as methyl vinyl ether and ethyl vinyl ether; α-olefins such as ethylene and propylene; halogenated α,β-unsaturated monomers such as vinyl chloride, vinylidene chloride, and vinyl fluoride; α, β-unsaturated aromatic monomers such as styrene and α-methylstyrene. These may be used singly or two or more of them may appropriately be used in combination.

The method of polymerizing the oxazoline group-containing polymer is not particularly limited. The oxazoline group-containing polymer can be produced by a conventionally known polymerization method, for example, suspension polymerization, solution polymerization, and emulsion polymerization. The feed form of the oxazoline group-containing compound is not particularly limited. Examples of the feed form include solution in organic solvent, aqueous solution, non-aqueous dispersion, and emulsion.

As the carbodiimide-based compound, those produced by various methods can be used. Examples of the carbodiimide-based compound include isocyanate-terminated polycarbodiimides that are basically synthesized by a condensation reaction involving decarbonization of organic diisocyanates. More specifically, the carbodiimide-based compound is obtained by reacting a carbodiimide compound containing at least two isocyanate groups in one molecule with a polyol having a hydroxyl group at a molecular terminal. Among them, preferred is a hydrophilically modified carbodiimide compound obtained via a step of reacting a carbodiimide compound and a polyol at a ratio such that the molar amount of the isocyanate groups of the carbodiimide compound exceeds the molar amount of the hydroxyl groups of the polyol, and a step of reacting a hydrophilizing agent having active hydrogen and a hydrophilic moiety with the reaction product obtained in the above-mentioned step.

The carbodiimide compound containing at least two isocyanate groups in one molecule is not particularly limited. From the viewpoint of reactivity, a carbodiimide compound having isocyanate groups at both ends is preferred. Methods for producing a carbodiimide compounds having isocyanate groups at both ends are well known to those skilled in the art. For example, a condensation reaction involving decarbonization of organic diisocyanate can be utilized.

If necessary, a curing catalyst that promotes the reaction of the curing agent may be used in combination. Examples of the curing catalyst include tin-based catalysts and weak acid catalysts. For example, by using a tin-based catalyst, a curing reaction of a blocked isocyanate resin or the like can be promoted. For example, by using a weak acid catalyst, a curing reaction of a melamine resin or the like can be promoted. As the tin-based catalyst, commercially available tin-based catalysts may be used. Examples of the weak acid catalyst include acid catalysts having a pKa ($H_2O$) greater than 1. Examples of such a weak acid catalyst include carboxylic acids such as acetic acid, propionic acid and benzoic acid, phosphoric acid, phosphoric acid esters, phenol, carbonic acid, boric acid, and hydrogen sulfide.

The solid content of the curing agent (a3) contained in the first aqueous coating composition (A) is preferably 5 parts by mass or more and 50 parts by mass or less, and more preferably 10 parts by mass or more and 40 parts by mass or less, per 100 parts by mass of the resin solid content of the first aqueous coating composition (A).

Acrylic Resin Emulsion (a4)

The first aqueous coating composition (A) preferably comprises an acrylic resin emulsion (a4) in addition to the components described above. The acrylic resin emulsion (a4) can be obtained, for example, by emulsion-polymerizing a monomer mixture comprising an alkyl (meth)acrylate (i), an acid group-containing ethylenically unsaturated monomer (ii), and a hydroxyl group-containing ethylenically unsaturated monomer (iii). The compounds (i), (ii) and (iii) shown below as examples each may be used singly, or two or more of those may be used appropriately in combination.

The alkyl (meth)acrylate (i) constitutes the backbone of the acrylic resin emulsion. Examples of the alkyl (meth)acrylate (i) include methyl (meth)acrylate, ethyl (meth)acrylate, propyl (meth)acrylate, n-butyl (meth)acrylate, isobutyl (meth)acrylate, t-butyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate, and stearyl (meth)acrylate. In the present description, for example, "methyl (meth) acrylate" means methyl acrylate and methyl methacrylate.

The acid group-containing ethylenically unsaturated monomer (ii) improves various performances such as storage stability, mechanical stability, and stability against freezing of the obtained acrylic resin emulsion. Further, the acid group-containing ethylenically unsaturated monomer (ii) promotes a curing reaction with a curing agent such as a melamine resin at the time of forming a coating film. The acid group is preferably selected from among a carboxyl group, a sulfonic acid group, and a phosphoric acid group. A particularly preferable acid group is a carboxyl group from the viewpoints of the above-mentioned improvement in various types of stability and the function of promoting a curing reaction. Among the acid group-containing ethylenically unsaturated monomers (ii), the carboxyl group-containing monomer is preferably contained in an amount of 50% by mass or more, and more preferably 80% by mass or more.

Examples of the carboxyl group-containing ethylenically unsaturated monomer include acrylic acid, methacrylic acid, crotonic acid, isocrotonic acid, ethacrylic acid, propylacrylic acid, isopropylacrylic acid, itaconic acid, maleic anhydride, and fumaric acid. Examples of the sulfonic acid group-containing ethylenically unsaturated monomer include p-vinylbenzenesulfonic acid, p-acrylamidopropanesulfonic acid, and t-butylacrylamidosulfonic acid. Examples of the phosphoric acid group-containing ethylenically unsaturated monomer include a phosphoric acid monoester of 2-hydroxyethyl acrylate and a phosphoric acid monoester of 2-hydroxypropyl methacrylate such as LIGHT ESTER PM (manufactured by Kyoeisha Chemical Co., Ltd.), etc.

The hydroxyl group-containing ethylenically unsaturated monomer (iii) imparts hydrophilicity based on its hydroxyl group to the acrylic resin emulsion. The hydroxyl group-containing ethylenically unsaturated monomer (iii) further improves workability and stability against freezing when it is used as a coating material, and imparts a curing reactivity with a melamine resin or an isocyanate-based curing agent to the acrylic resin emulsion.

Examples of the hydroxyl group-containing ethylenically unsaturated monomer (iii) include 2-hydroxyethyl (meth) acrylate, 2-hydroxypropyl (meth)acrylate, 4-hydroxybutyl (meth)acrylate, N-methylolacrylamide, allyl alcohol, and ε-caprolactone-modified acrylic monomers.

Examples of the above-mentioned ε-caprolactone-modified acrylic monomers include PLACCEL FA-1, PLACCEL FA-2, PLACCEL FA-3, PLACCEL FA-4, PLACCEL FA-5, PLACCEL FM-1, PLACCEL FM-2, PLACCEL FM-3, PLACCEL FM-4, and PLACCEL FM-5 manufactured by Daicel Corporation.

The monomer mixture to be used for the preparation of the acrylic resin emulsion may comprise at least one monomer selected from the group consisting of styrene-based monomers, (meth)acrylonitrile and (meth) acrylamide as optional components in addition to the above-mentioned monomers (i), (ii) and (iii). Examples of the styrene-based monomer include styrene and α-methylstyrene.

The monomer mixture may also comprise a crosslinkable monomer such as a carbonyl group-containing ethylenically unsaturated monomer, a hydrolytically polymerizable silyl group-containing monomer, and various polyfunctional vinyl monomers. When these crosslinkable monomers are contained, the resulting acrylic resin emulsion has self-crosslinkability.

Examples of the carbonyl group-containing ethylenically unsaturated monomer include monomers having a keto group such as acrolein, diacetone (meth)acrylamide, acetoacetoxyethyl (meth)acrylate, formylstyrol, and alkyl vinyl ketones having 4 to 7 carbon atoms (for example, methyl vinyl ketone, ethyl vinyl ketone, and butyl vinyl ketone). Among these, diacetone (meth)acrylamide is preferred.

Examples of the hydrolytically polymerizable silyl group-containing monomer include monomers having an alkoxysilyl group such as γ-(meth)acryloxypropylmethyldimethoxysilane, γ-(meth)acryloxypropylmethyldiethoxysilane, and γ-(meth)acryloxypropyltriethoxysilane.

The polyfunctional vinyl monomer is a compound having two or more radically polymerizable, ethylenically unsaturated groups in the molecule. Examples of the polyfunctional vinyl monomer include divinyl compounds such as divinylbenzene, ethylene glycol di(meth)acrylate, hexanediol di(meth)acrylate, polyethylene glycol di(meth)acrylate, allyl (meth)acrylate, 1,4-butanediol di(meth)acrylate, 1,6-hexane di(meth)acrylate, neopentylglycol di(meth)acrylate, and pentaerythritol di(meth)acrylate; pentaerythritol tri (meth)acrylate; trimethylolpropane tri(meth)acrylate; and dipentaerythritol hexa(meth)acrylate.

The acrylic resin emulsion can be prepared by emulsion-polymerizing a monomer mixture comprising the above-described (i), (ii) and (iii). The emulsion polymerization (emulsion copolymerization) can be performed by heating the monomer mixture together with a radical polymerization initiator and an emulsifier in a water-soluble solution with stirring. The reaction temperature is preferably, for example, 30° C. or higher and 100° C. or lower. The reaction time is preferably, for example, 1 hour or more and 10 hours or less. The reaction temperature can be adjusted by adding the monomer mixture or a monomer pre-emulsified solution all at once to a reaction vessel charged with water and the emulsifier, or by dropping the monomer mixture or the monomer pre-emulsified solution for a while.

As the radical polymerization initiator, known initiators usually used in emulsion polymerization of acrylic resins can be used. Specifically, as a water-soluble free radical polymerization initiator, for example, persulfates such as potassium persulfate, sodium persulfate and ammonium persulfate, or azo compounds such as 4,4'-azobis-4-cyanovaleric acid can used in the form of an aqueous solution. Alternatively, a so-called redox initiator containing a combination of an oxidizing agent such as potassium persulfate, sodium persulfate, ammonium persulfate and hydrogen peroxide and a reducing agent such as sodium bisulfite, sodium thiosulfate, Rongalite and ascorbic acid is used in the form of an aqueous solution. Among these, redox initiators are preferred.

The emulsifier is selected from amphipathic compounds having a hydrocarbon group and a hydrophilic moiety in the same molecule. Anionic or nonionic emulsifiers are preferred. The hydrocarbon group has, for example, six or more carbon atoms. Examples of the hydrophilic moieties include carboxylates, sulfonates, and partial esters of sulfates.

Among these, examples of the anionic emulsifier include an alkali metal salt or an ammonium salt of a half ester of sulfuric acid with an alkyl phenol or a higher alcohol; an alkali metal salt or an ammonium salt of an alkyl sulfonate or an allyl sulfonate; an alkali metal salt or an ammonium salt of a half ester of sulfuric acid with a polyoxyethylene alkylphenyl ether, a polyoxyethylene alkyl ether or a polyoxyethylene allyl ether. Examples of the nonionic emulsifier include a polyoxyethylene alkylphenyl ether, a polyoxyethylene alkyl ether, or a polyoxyethylene allyl ether. Besides such known anionic and nonionic emulsifiers, various anionic or nonionic, reactive emulsifiers each having, in its molecule, a radically polymerizable unsaturated double bond-containing group, such as an acrylic group, a methacrylic group, a propenyl group, an allyl group, an allyl ether group, a maleic group can be used singly or two or more of them may be used in combination.

During emulsion polymerization, an auxiliary agent for adjusting the molecular weight (chain transfer agent) is used as necessary. It is often preferable to use these auxiliary agents (chain transfer agents) from the viewpoint of promoting emulsion polymerization and from the viewpoint of promoting smooth and uniform formation of a coating film and improving the adhesiveness to an article to be coated. Examples of such auxiliary agents include mercaptan compounds, lower alcohols, and α-methylstyrene dimer.

The method of emulsion polymerization is not particularly limited. As a polymerization method, for example, a conventional single-stage continuous uniform dropwise monomer addition method, a core-shell polymerization method that is a multi-stage monomer feeding method, and a power feed polymerization method wherein formulation of the monomers to be fed is continuously altered during polymerization may be used. The conventional single-stage continuous uniform dropwise monomer addition method can afford a single-layer acrylic resin emulsion. The core-shell polymerization method can afford a core-shell type acrylic resin emulsion.

In this way, the acrylic resin emulsion to be used in the present invention is prepared. The weight-average molecular weight of the acrylic resin constituting the acrylic resin emulsion is not particularly limited. Generally, the weight-average molecular weight of the acrylic resin is preferably about 50,000 or more and about 1,000,000 or less, and more preferably about 100,000 or more and about 800,000 or less. The glass transition temperature (Tg) of the acrylic resin is preferably −20° C. or higher and 60° C. or lower, more preferably −10° C. or higher and 50° C. or lower, and further preferably 0° C. or higher and 40° C. or lower. The Tg of the acrylic resin emulsion can be calculated based on the known Tg and composition ratio of the constituent monomers or homopolymers.

The solid acid value of the acrylic resin is preferably 2 mg KOH/g or more and 60 mg KOH/g or less, and more preferably 5 mg KOH/g or more and 50 mg KOH/g or less. The solid acid value of the acrylic resin can be adjusted by choosing the type and blending amount of each of the monomer components such that the solid acid value of the resin falls within the above range.

The solid hydroxyl value of the acrylic resin is preferably 10 mg KOH/g or more and 120 mg KOH/g or less, and more preferably 20 mg KOH/g or more and 100 mg KOH/g or less. The solid acid value and the solid hydroxyl value of the acrylic resin can be calculated based on the solid acid value and the solid hydroxyl value of the monomer mixture used.

A basic compound may be added to the resulting acrylic resin emulsion to neutralize a part or all of the carboxylic acid. As a result, the dispersion stability of the acrylic resin emulsion is further improved. Examples of the basic compound include ammonia, various amines, and alkali metals.

The solid content of the acrylic resin emulsion (a4) contained in the first aqueous coating composition (A) is preferably in the range of 10 parts by mass or more and 45 parts by mass or less, and more preferably in the range of 15 parts by mass or more and 40 parts by mass or less, per 100 parts by mass of the resin solid content of the first aqueous coating composition (A).

Water-Dispersible Polyester Resin

The first aqueous coating composition (A) preferably comprises a water-dispersible polyester resin in addition to the above-described components. The water-dispersible polyester resin is a kind of the first coating film-forming resin. The water-dispersible polyester resin can be prepared, for example, by condensing a polyhydric alcohol component and a polybasic acid component. In the condensation, an oil component that is one species or a mixture of two or more species selected from among castor oil, dehydrated castor oil, tung oil, safflower oil, soybean oil, flaxseed oil, tall oil, palm oil, and the like may be used, if necessary. Further, the polyester resin may be grafted with an acrylic resin or a vinyl resin, if necessary.

Examples of the polyhydric alcohol component include diols such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediols, 3-methyl-1,5-pentanediol, 2,2,4-trimethylpentanediol, and hydrogenated bisphenol A; trihydric or higher polyol components such as trimethylolpropane, trimethylolethane, glycerin, and pentaerythritol; and hydroxycarboxylic acid components such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid.

Examples of the polybasic acid component include polybasic acid components and anhydrides thereof including aromatic polycarboxylic acids and anhydrides thereof such as phthalic anhydride, isophthalic acid, terephthalic acid, trimellitic anhydride, tetrabromophthalic anhydride, tetrachlorophthalic anhydride, and pyromellitic anhydride; alicyclic polycarboxylic acids and anhydrides thereof such as hexahydrophthalic anhydride, tetrahydrophthalic anhydride, and 1,4- and 1,3-cyclohexanedicarboxylic acids; aliphatic polycarboxylic acids and anhydrides thereof such as maleic anhydride, fumaric acid, succinic anhydride, adipic acid, sebacic acid, and azelaic acid. A monobasic acid such as benzoic acid and tert-butylbenzoic acid may be used together, if necessary.

When preparing the polyester resin, a monohydric alcohol, a monoepoxide compound such as Cardura E (trade name: manufactured by Shell Chemicals), and lactones may be used as other reaction components. Examples of the lactones include β-propiolactone, dimethylpropiolactone, butyrolactone, γ-valerolactone, ε-caprolactone, γ-caprolactone, γ-caprylolactone, crotolactone, δ-valerolactone, and δ-caprolactone. In particular, the lactones can be ring-opened and added to the polyester chains of polyvalent carboxylic acids and polyhydric alcohols to form polyester chains by themselves. The lactones also help improve the chipping resistance of the first aqueous coating composition (A). Such other reaction components may be contained in an amount of 3% by mass or more and 30% by mass or less, preferably 5% by mass or more and 20% by mass or less, and particularly 7% by mass or more and 15% by mass or less, based on the total mass of all reaction components.

The water-dispersible polyester resin can be easily made aqueous by adjusting its acid value and neutralizing its carboxyl groups with a basic substance. Examples of the basic substance include ammonia, methylamine, ethylamine, dimethylamine, diethylamine, trimethylamine, triethylamine, dimethylethanolamine, diethanolamine, and triethanolamine. Among these, diethanolamine, dimethylethanolamine, and triethanolamine are preferable. Further, the neutralization rate of the carboxyl groups at the time of the neutralization is not particularly limited. The neutralization rate of the carboxyl groups is, for example, preferably 50 mol % or more, more preferably 80 mol % or more and 120 mol % or less.

The number-average molecular weight (Mn) of the water-dispersible polyester resin is preferably 800 or more and 10,000 or less, and more preferably 1,000 or more and 8,000 or less. The solid hydroxyl value of the water-dispersible polyester resin is preferably 10 mg KOH/g or more and 170 mg KOH/g or less, and more preferably 15 mg KOH/g or more and 150 mg KOH/g or less. The solid acid value of the water-dispersible polyester resin is preferably 15 mg KOH/g or more and 100 mg KOH/g or less.

The glass transition temperature (Tg) of the water-dispersible polyester resin is preferably −40° C. or higher and 50° C. or lower. The glass transition temperature can be measured with a differential scanning calorimeter (DSC) or the like.

The amount of the water-dispersible polyester resin is preferably 10 parts by mass or more and 60 parts by mass or less, and more preferably 15 parts by mass or more and 50 parts by mass or less, per 100 parts by mass of the resin solid content of the first aqueous coating composition (A).

Preparation of First Aqueous Coating Composition (A)

The first aqueous coating composition (A) may comprise, for example, an additional resin component, a pigment-dispersing paste, or other additives in addition to the above-described components. Examples of the additives include dispersants, ultraviolet absorbers, light stabilizers, antioxidants, antifreezing agents, matting agents, algae-proofing agents, defoaming agents, film-forming aids, preservatives, fungicides, and reaction catalysts.

Examples of such additional resin component include resins having a hydroxyl group, such as polyether diol and polycarbonate diol. Such additional resin components can be used in an arbitrary amount as long as the functions (water resistance, chipping resistance, etc.) of the first aqueous coating composition (A) are not impaired.

The pigment-dispersing paste is obtained by dispersing a pigment and a pigment dispersant in a small amount of an aqueous medium in advance. The pigment dispersant is a resin having a structure including a pigment-affinitive part and a hydrophilic part. Examples of the pigment-affinitive part and the hydrophilic part include nonionic, cationic and anionic functional groups. The pigment dispersant may have two or more types of the above-mentioned functional groups in one molecule.

Examples of the nonionic functional group include a hydroxyl group, an amide group, and a polyoxyalkylene group. Examples of the cationic functional group include an amino group, an imino group, and a hydrazino group. Examples of the anionic functional group include a carboxyl group, a sulfonic acid group, and a phosphoric acid group. Such pigment dispersants can be produced by methods well known to those skilled in the art.

As the pigment dispersant, those capable of efficiently dispersing a pigment in a small amount are preferable. As the pigment dispersant, for example, commercially available pigment dispersants (those listed below are trade names) can be used. Specific examples include Disperbyk 190, Disperbyk 181, Disperbyk 182, and Disperbyk 184 (all manufactured by BYK-Chemie GmbH) and EFKAPOLYMER 4550 (manufactured by EFKA), which are anion-nonionic dispersants, Solsperse 27000 (manufactured by Avecia), which is a nonionic dispersant, and Solsperse 41000 and Solsperse 53095 (all manufactured by Avecia), which are anionic dispersants. The number-average molecular weight of the pigment dispersant is preferably 1,000 or more and 100,000 or less, more preferably 2,000 or less and 50,000 or less, and further preferably 4,000 or more and 50,000 or less.

The pigment-dispersing paste can be obtained by mixing and dispersing a pigment dispersant and a pigment according to a known method. The ratio of the pigment dispersant during the production of the pigment-dispersing paste is preferably 1% by mass or more and 20% by mass or less, based on the solid content of the pigment-dispersing paste. The ratio of the pigment dispersant is preferably 5% by mass or more and 15% by mass or less.

The pigment is not particularly limited as long as it is a pigment that is used in ordinary water-based coating materials. Above all, a coloring pigment is preferable from the viewpoint of improving weather resistance and easily ensuring hiding property. In particular, titanium dioxide is more preferable because it is superior in hiding property of color and is inexpensive.

Examples of pigments other than titanium dioxide include organic coloring pigments such as azo chelate pigments, insoluble azo pigments, condensed azo pigments, phthalocyanine-based pigments, indigo pigments, perinone-based pigments, perylene-based pigments, dioxane-based pigments, quinacridone-based pigments, isoindolinone-based pigments, diketopyrrolopyrrole-based pigments, benzimidazolone-based pigments, and metal complex pigments; and inorganic colored pigments such as chrome yellow, yellow iron oxide, red iron oxide, and carbon black. These pigments may be used in combination with extender pigments such as calcium carbonate, barium sulfate, clay, and talc.

Preferably, the ratio of the mass of the pigment to the total mass of the solid of all resins and the pigment contained in the first aqueous coating composition (A) (PWC; pigment weight content) is 10% by mass or more and 60% by mass or less.

Examples of other additives include additives that are commonly added in addition to the above-described components, such as ultraviolet absorbers, antioxidants, defoaming agents, surface conditioning agents, and antipinholing agents. The amounts of them are within ranges known to those skilled in the art.

The first aqueous coating composition can be prepared by mixing the above-described components and, if necessary, other components. The order in which these components are added is not particularly limited. The form of the first aqueous coating composition is not particularly limited as long as it is aqueous. Examples of the form of the first aqueous coating composition include water-soluble, water-dispersible, and emulsion.

Second Aqueous Coating Composition (B)

In the above-mentioned method for forming a multilayer coating film, the second aqueous coating composition (B) is used for forming the second aqueous coating film. The second aqueous coating composition (B) may comprise water and an organic solvent as diluent components, a second coating film-forming resin, a curing agent, various organic and inorganic coloring pigments, extender pigments and, if necessary, luster pigments, etc. as solid components.

The second aqueous coating composition (B) comprises 0.5% by mass or more and 5% by mass or less of an organic solvent having a solubility in water of 0.1% or more and 7% or less in a state of being diluted to a coating viscosity (this may hereinafter be referred to as a first organic solvent). The second aqueous coating composition (B) comprises 0.05% by mass or more and 2.5% by mass or less of an organic solvent that is insoluble in water in a state of being diluted to a coating viscosity (this may hereinafter be referred to as a second organic solvent). Outside the above range, the popping limit is lowered and the flip-flop property of the formed coating film deteriorates. The content of the first organic solvent is preferably 0.8% by mass or more and 4% by mass or less, and more preferably 1% by mass or more and 3.5% by mass or less. The content of the second organic solvent is preferably 0.1% by mass or more and 2% by mass or less, and more preferably 0.5% by mass or more and 1.8% by mass or less. Above all, it is preferable that the first organic solvent is contained in an amount of 0.8% by mass or more and 4% by mass or less and the second organic solvent is contained in an amount of 0.1% by mass or more and 2% by mass or less. It is more preferable that the first organic solvent is contained in an amount of 1% by mass or more and 3.5% by mass or less and the second organic solvent is contained in an amount of 0.5% by mass or more and 1.8% by mass or less. The solubility in water is expressed in percentage by the mass of an organic solvent that uniformly mixes when the organic solvent is mixed with water at 20° C. The phrase that the popping limit is lowered means that the maximum film thickness of the coating film that does not cause swelling or minute holes is reduced.

Examples of the first organic solvent include butanol (boiling point: 118° C., solubility: 6.4%), isobutyl acetate (boiling point: 118° C., solubility: 0.7%), butyl acetate (boiling point: 126° C., solubility: 2.3%), isoamyl acetate (boiling point: 143° C., solubility: 1.2%), ethylene glycol monohexyl ether (commonly known as "hexylcellosolve", boiling point: 208° C., solubility: 0.99%), diethylene glycol monohexyl ether (boiling point: 259° C., solubility: 1.70%), ethylene glycol-2-ethylhexyl ether (boiling point: 229° C., solubility: 0.20%), diethylene glycol-2-ethylhexyl ether (boiling point: 272° C., solubility: 0.30%), ethylene glycol butyl propylene (boiling point: 170° C., solubility: 6.40%), diethylene glycol butyl propylene (boiling point: 212° C., solubility: 4.80%), propylene glycol butyl ether (boiling point: 170° C., solubility: 6%), dipropylene glycol butyl ether (boiling point: 229° C., solubility: 5%), ethylene glycol monobutyl ether acetate (commonly known as "butycel acetate", boiling point: 191° C., solubility: 1.1%), diethylene glycol monobutyl ether acetate (commonly known as "butyl carbitol acetate", boiling point: 246° C., solubility: 6.5%), methyl methoxybutylacetate (commonly known as "Solfit acetate", boiling point: 188° C., solubility: 6.8%), ethyl ethoxypropionate (commonly known as "EEP", boiling point: 169° C., solubility: 1.6%), nitropropane (boiling point: 122-199° C., solubility: 1.7%), methyl isobutyl ketone (boiling point: 115° C., solubility: 2.0%), methyl amyl ketone (commonly known as "MAK", boiling point: 153° C., solubility: 0.46%), and oxohexyl acetate (commonly known as "OHA", boiling point: 170° C., solubility: 0.27%). The solubility described in parentheses indicates the solubility in water (hereinafter, the same applies).

The boiling point of the first organic solvent is preferably 160° C. or higher and 280° C. or lower. The solubility of the first organic solvent in water is preferably 0.3% or more and 3% or less. Examples of preferred first organic solvents include ethylene glycol monohexyl ether (commonly known as "hexylcellosolve", boiling point: 208° C., solubility: 0.99%), diethylene glycol monohexyl ether (boiling point: 259° C., solubility: 1.70%), ethylene glycol-2-ethylhexyl ether (boiling point: 229° C., solubility: 0.20%), diethylene glycol-2-ethylhexyl ether (boiling point: 272° C., solubility:

0.30%), ethylene glycol monobutyl ether acetate (commonly known as "butycel acetate", boiling point: 191° C., solubility: 1.1%), ethyl ethoxypropionate (commonly known as "EEP", boiling point: 169° C., solubility: 1.6%), and nitropropane (boiling point: 122-199° C., solubility: 1.7%).

Examples of the second organic solvent include hydrocarbon-based organic solvents such as n-hexane (boiling point: 67° C.), heptane (boiling point: 98° C.), cyclohexane (boiling point: 81° C.), mineral spirit (boiling point: 140-180° C.), Swasol 310 (manufactured by Exxon, boiling point: 153-177° C., trade name), Shellsol 70 (manufactured by Showa Shell, boiling point: 143-164° C., trade name), Shellsol 71 (manufactured by Showa Shell, boiling point: 165-192° C., trade name), Shellsol D40 (manufactured by Showa Shell, boiling point: 151-188° C., trade name), Shellsol A (manufactured by Showa Shell, boiling point: 160-182° C., trade name), toluene (boiling point: 110° C.), xylene (boiling point: 144° C.), S-100 (organic solvent manufactured by Esso, boiling point: 158-177° C., trade name), and S-150 (organic solvent manufactured by Esso, boiling point: 185-211° C., trade name). The expression "insoluble in water" as used in the present invention is that when an organic solvent is mixed with water at 20° C., the mass of the organic solvent that is uniformly mixed is less than 0.1%.

The second organic solvent is preferably a hydrocarbon-based organic solvent having a boiling point of 145° C. or higher and 200° C. or lower. Examples of such a second organic solvent include Swasol 310 (manufactured by Exxon, boiling point: 153-177° C., trade name), Shellsol 70 (manufactured by Showa Shell, boiling point: 143-164° C., trade name), Shellsol 71 (manufactured by Showa Shell, boiling point: 165-192° C., trade name), Shellsol D40 (manufactured by Showa Shell, boiling point: 151-188° C., trade name), Shellsol A (manufactured by Showa Shell, boiling point: 160-182° C., trade name), S-100 (organic solvent manufactured by Esso, boiling point: 158-177° C., trade name), and S-150 (organic solvent manufactured by Esso, boiling point: 185-211° C., trade name).

The mixing ratio of the first organic solvent to the second organic solvent (=first organic solvent/second organic solvent) is preferably ½ or more and 8/1 or less. By adjusting the amount of the organic solvent in the dilution medium to the above range, the generation of popping is suppressed and it becomes easy to obtain a coating film being superior in flip-flop property and appearance. The mixing ratio (=first organic solvent/second organic solvent) is more preferably 1/1 or more and 4/1 or less.

The second aqueous coating composition (B) may comprise other organic solvents as a dilution medium together with the first organic solvent and the second organic solvent. Such other organic solvents are not particularly limited. Examples of the other organic solvents include ester-based organic solvents such as ethyl acetate (boiling point: 77° C., solubility: 7.9%), ethylene glycol monomethyl ether acetate (commonly known as "methycello", boiling point: 145° C., solubility: ∞), ethylene glycol monoethyl ether acetate (commonly known as "celloace", boiling point: 156° C., solubility: 22.9%), propylene glycol monomethyl ether acetate (commonly known as "PMAC", boiling point: 144° C., solubility: 20.5%), and diethylene glycol monoethyl ether acetate (commonly known as "carbitol acetate", boiling point: 217° C., solubility: ∞).

As the other organic solvent, an ether-based organic solvent may be used. Examples of the ether-based organic solvent include propylene glycol methyl ether (commonly known as "methoxypropanol", boiling point: 119° C., solubility: ∞), propylene glycol ethyl ether (commonly known as "ethoxypropanol", boiling point: 130° C., solubility: ∞), ethylene glycol monoethyl ether (commonly known as "ethycello", boiling point: 136° C., solubility: ∞), methylmethoxybutanol (commonly known as "Solfit", boiling point: 174° C., solubility: ∞), ethylene glycol monobutyl ether (commonly known as "butycello", boiling point: 171° C., solubility: ∞), diethylene glycol monoethyl ether (commonly known as "ethylcarbitol", boiling point: 196° C., solubility: ∞), and diethylene glycol monobutyl ether (commonly known as "butylcarbitol", and "BDG" (manufactured by Nippon Nyukazai Co., Ltd., trade name), boiling point: 230° C., solubility: ∞).

As the other organic solvent, an alcohol-based organic solvent may be used. Examples of the alcohol-based organic solvent include methanol (boiling point: 65° C., solubility: ∞), ethanol (boiling point: 78° C., solubility: ∞), and propanol (boiling point: 97° C., solubility: ∞). As the other organic solvent, a ketone-based organic solvent may be used. Examples of the ketone-based organic solvent include acetone (boiling point: 56° C., solubility: ∞) and methyl ethyl ketone (boiling point: 80° C., solubility: 22.6%).

The total amount of the organic solvents contained in the second aqueous coating composition (B) is approximately 0.1% by mass or more and 15% by mass or less. The total mass content of the volatile matter of the second aqueous coating composition (B) is 50% by mass or more and 85% by mass or less. Preferably, the total amount of the organic solvents is 0.1% by mass or more and 13% by mass or less. Preferably, the total mass of the volatile matter is 55% by mass or more and 80% by mass or less.

Examples of preferable second coating film-forming resins include acrylic resin, polyester resin, alkyd resin, polyether resin, polyolefin resin, urethane resin, and curing agents having reactivity with these resin components. In particular, the second aqueous coating composition (B) preferably contains a water-dispersible acrylic resin and a curing agent. The water-dispersible acrylic resin can be obtained by solution-polymerizing a mixture of polymerizable unsaturated monomers. As the polymerizable unsaturated monomers, the (meth)acrylic acid alkyl ester (i), the carboxyl group-containing ethylenically unsaturated monomer (ii), and the hydroxyl group-containing ethylenically unsaturated monomer (iii) described in the preparation of the acrylic resin emulsion can be used. The acrylic resin prepared by the above polymerization may, for example, be neutralized with a basic compound and used in the form of an aqueous solution. Examples of the basic compound include organic amines such as monomethylamine, dimethylamine, trimethylamine, triethylamine, diisopropylamine, monoethanolamine, diethanolamine, and dimethylethanolamine.

As the second coating film-forming resin, an acrylic resin emulsion and a curing agent that can be suitably used in the first aqueous coating composition (A) may be used.

Examples of preferable curing agents include amino resins (e.g., melamine resin), a blocked isocyanate resins, epoxy compounds, aziridine compounds, carbodiimide compounds, and oxazoline compounds. From the viewpoints of the performances and the cost of the resulting coating film, a melamine resin and/or a blocked isocyanate resin is preferred, and a melamine resin is more preferred. As such a curing agent, a curing agent that can be used in the first aqueous coating composition (A) can be suitably used.

The content of the curing agent is preferably 15 parts by mass or more and 50 parts by mass or less per 100 parts by mass of the resin solid components of the second aqueous coating composition (B).

Examples of the coloring pigment include organic pigments such as azo chelate-based pigments, insoluble azo-based pigments, condensed azo-based pigments, diketopyrrolopyrrole-based pigments, benzimidazolone-based pigments, phthalocyanine-based pigments, indigo pigments, perinone-based pigments, perylene-based pigments, dioxane-based pigments, quinacridone-based pigments, isoindolinone-based pigments, and metal complex pigments; and inorganic pigments such as chrome yellow, yellow iron oxide, red iron oxide, carbon black, and titanium dioxide. As the extender pigment, calcium carbonate, barium sulfate, clay, talc and the like are used. If necessary, a luster pigment may be further used.

The shape of the luster pigment is not particularly limited. The luster pigment may be further colored. The average particle size ($D_{50}$) of the luster pigment is preferably, for example, 2 µm or more and 50 µm or less. The thickness of a flake-shaped luster pigment is preferably 0.1 µm or more and 5 µm or less. Among them, luster pigments having an average particle size in the range of 10 µm or more and 35 µm or less are more suitably used because they are superior in luster feeling.

Examples of the luster pigment include non-colored or colored metallic luster pigments such as metal, alloy or the like such as aluminum, copper, zinc, iron, nickel, tin, and aluminum oxide. Further, an interference mica pigment, a white mica pigment, a graphite pigment, and other colored or colored flat pigments may be used in combination.

The ratio (PWC) of the mass of the pigment to the total mass of the resin solid components, the luster pigment, and all other pigments contained in the second aqueous coating composition (B) is preferably 0.1% by mass or more and 50% by mass or less, more preferable 0.5% by mass or more and 40% by mass or less, and even more preferably 1.0% by mass or more and 30% by mass or less.

To the second aqueous coating composition (B) may be added a viscosity controlling agent in order to prevent mixing with a clear coating film and to ensure coating workability. As the viscosity controlling agent, one that exhibits a thixotropic property can be commonly used. Examples of the viscosity controlling agent include polyamide-based viscosity controlling agents such as a swelling dispersion of aliphatic acid amide, amide-based aliphatic acid, and phosphates of long-chain polyaminoamide; polyethylene-based viscosity controlling agents such as a colloidal swelling dispersion of polyethylene oxide; organic bentonite-based viscosity controlling agents such as organic acid smectite clay and montmorillonite; inorganic pigments such as aluminum silicate and barium sulfate; flat pigments capable of developing viscosity depending on the shape of the pigment; and crosslinked or non-crosslinked resin particles.

In addition to the above-mentioned components, additives commonly added to coating materials, such as a surface conditioning agent, an antioxidant, and a defoaming agent, may be incorporated in the second aqueous coating composition (B). The amounts of them are within ranges known to those skilled in the art.

The method for producing the coating composition to be used in the present invention is not particularly limited, and it can be prepared by a method commonly used by those skilled in the art.

Clear Coating Film

In order to form the clear coating film, a clear coating composition is used. The clear coating composition is not particularly limited. The clear coating composition may comprise a coating film-forming thermosetting resin, a curing agent, and so on, or may comprise a coating film-forming thermoplastic resin. Examples of the form of the clear coating composition include solvent type, aqueous type, and powder type.

From the viewpoint of transparency or resistance to acid etching, preferable examples of the solvent-type clear coating composition include a combination of an acrylic resin and/or a polyester resin with an amino resin, or an acrylic resin and/or a polyester resin with a carboxylic acid-epoxy curing system.

The clear coating composition may be a urethane clear coating composition. The urethane clear coating composition comprises, for example, a hydroxyl group-containing resin and an isocyanate compound curing agent. The isocyanate compound curing agent is not particularly limited. Examples of the isocyanate compound curing agent include aliphatic isocyanates such as trimethylene diisocyanate, tetramethylene diisocyanate, pentamethylene diisocyanate, hexamethylene diisocyanate (HDI), and trimethylhexamethylene diisocyanate; aliphatic cyclic isocyanates such as 1,3-cyclopentane diisocyanate, 1,4-cyclohexane diisocyanate, and 1,2-cyclohexane diisocyanate; aromatic isocyanates such as xylylene diisocyanate (XDI), 2,4-tolylene diisocyanate (TDI), and 2,6-tolylene diisocyanate; alicyclic isocyanates such as isophorone diisocyanate (IPDI) and norbornane diisocyanate; multimers such as biuret type and nurate type of these isocyanates; and mixtures thereof.

The aqueous clear coating composition may comprise, for example, a resin obtained by neutralizing the coating film-forming resin contained in the solvent-type clear coating composition with a base to make it aqueous. The neutralization may be carried out before or after polymerization by adding a tertiary amine such as dimethylethanolamine and triethylamine.

As the powder-type clear coating composition, common powder coating materials such as thermoplastic and thermosetting powder coating materials can be used. Thermosetting powder coating materials are preferable in that coating films having good physical properties can be obtained. Examples of the thermosetting powder coating composition include clear coating compositions comprising epoxy-based, acrylic-based and polyester-based powder coating materials. Among these, a clear coating composition comprising an acrylic-based powder coating material is preferable in terms of good weather resistance.

In particular, a powder-type clear coating composition comprising an epoxy-containing acrylic resin/polyvalent carboxylic acid-based powder coating material is preferable because there are no volatilized substances emitted during curing, a good appearance can be obtained, and little yellowing occurs.

Similar to the above-described coating composition, it is preferable that a viscosity controlling agent has been added to the clear coating composition in order to ensure coating workability. As the viscosity controlling agent, one that exhibits a thixotropic property can be commonly used. As such, for example, those mentioned in the above description of the coating composition can be used. The clear coating composition may comprise a curing catalyst, a surface conditioning agent, and so on, if necessary.

Article to be Coated

The article to be coated for use in the method for forming a multilayer coating film is not particularly limited, and examples thereof include iron, copper, aluminum, tin, zinc, alloys containing these metals, products plated or vapor-deposited with these metals. The article may have a cured electrodeposition coating film formed on the surface thereof. The cured electrodeposition coating film is formed by electrodeposition coating an electrodeposition coating material on an article and then heat curing it. The article to be coated may have been subjected to a chemical conversion treatment using a chemical conversion agent such as a phosphorylation chemical conversion agent or a zirconium chemical conversion agent before the electrodeposition coating is performed.

The electrodeposition coating material is not particularly limited. As the electrodeposition coating material, a known cationic electrodeposition coating material or anionic electrodeposition coating material can be used. The electrodeposition coating method and the heat curing of the electrodeposition-coated coating film can be carried out by a method and under conditions commonly used for electrodeposition coating for automobile bodies and parts.

Method for Forming Multilayer Coating Film

The method for forming a multilayer coating film comprises:

a first aqueous coating composition application step of applying a first aqueous coating composition (A) to the surface of an article to form an uncured first aqueous coating film, a second aqueous coating composition application step applying a second aqueous coating composition (B) onto the uncured first aqueous coating film to form an uncured second aqueous coating film, a clear coating step of applying a clear coating composition (C) onto the uncured second aqueous coating film to form an uncured clear coating film, and a curing step of heat-curing at once the uncured first aqueous coating film, the uncured second aqueous coating film, and the uncured clear coating film in the steps defined above to form a multilayer coating film.

In the above method, the first aqueous coating composition (A) comprises a water-dispersible polyurethane resin (a1) and a viscosity modifier (a2), the second aqueous coating composition (B) comprises water and an organic solvent as diluent components besides solid components in a state of dilution to a coating viscosity, and contains, as a part of the organic solvent, an organic solvent having a solubility in water of 0.1 to 7%, in an amount of 0.4 to 5.0% by mass per the total amount of the coating material, and also contains an organic solvent insoluble in water in an amount of 0.05 to 2.5% by mass per the total amount of the coating material, and $M_B$, which is a droplet mass of the second aqueous coating composition (B) at the time of applying the composition to the uncured first aqueous coating film, $V_B$, which is a collision speed, and $\eta_A$, which is a shear viscosity of the uncured first aqueous coating film measured at a shear rate of 10,000 $\sec^{-1}$, satisfy the following formula:

$$M_B V_B / \eta_A < 3.0 \times 10^{-7}.$$

Thereby, a multilayer coating film having a good appearance can be obtained.

As described above, it is required that $M_B$, which is a droplet mass of the second aqueous coating composition (B) at the time of applying the composition to the uncured first aqueous coating film, $V_B$, which is a collision speed, and $\eta_A$, which is a shear viscosity of the uncured first aqueous coating film measured at a shear rate of 10,000 $\sec^{-1}$, satisfy the following formula:

$$M_B V_B / \eta_A < 3.0 \times 10^{-7}.$$

The present inventors experimentally found that in so-called wet-on-wet coating, in which the second aqueous coating composition (B) is applied on the uncured first aqueous coating film, the appearance of a resulting multilayer coating film can be improved by making adjustment so as to satisfy the above formula.

In the above formula, the product of the droplet mass $M_B$ and the collision speed $V_B$ "$M_B$-$V_B$" corresponds to the magnitude of the momentum of the droplets of the second aqueous coating composition (B) at the time of applying the second aqueous coating composition (B) onto the uncured first aqueous coating film.

Specifically, when a coating material particle having a droplet mass of $M_B$ (kg) is applied onto an uncured first aqueous coating film at a collision speed of $V_B$ (m/), the momentum "the mass of the coating material particle×the collision speed" is "the volume (m³) of the coating material particle×the density (kg/m³)×the collision speed $V_B$ (m/s)". This is because the mass of the coating material particle is calculated by "the volume (m³)×the density (kg/m³)". The volume (m³) of the coating material particle having a droplet particle size $m_B$ (m) is calculated by "(4/3)×7×(the particle size $m_B/2$)³".

It is difficult to measure the mass itself at the moment when the droplet of the second aqueous coating composition (B) is applied onto the uncured first aqueous coating film. On the other hand, it is possible to measure the size (diameter) of the droplet. Therefore, when calculating the above momentum, "the volume of a coating material particle (m³)×the density (kg/m³)×the collision speed $V_B$ (m/s)" is used in the present invention.

It was experimentally found that when the value (kg·m)/(s·Pa·s) obtained by dividing the above momentum by the shear viscosity $\eta_A$ (Pa·s) of the uncured first aqueous coating film measured at a shear rate of 10,000 $\sec^{-1}$ satisfies the formula $$M_B V_B / \eta_A < 3.0 \times 10^{-7},$$

the momentum of the droplet of the second aqueous coating composition (B) is controlled by the uncured first aqueous coating film. By controlling the momentum of the droplet of the second aqueous coating composition (B), the appearance of a resulting multilayer coating film is improved.

The shear viscosity $\eta_A$ of the uncured first aqueous coating film is preferably a viscosity $\eta_{A1}$. The viscosity $\eta_{A1}$ is measured under the conditions of a temperature of 23° C. and a shear rate of 10,000 $\sec^{-1}$ at the time of 3 minutes after the first aqueous coating composition (A) is applied under a coating condition such that a dry film thickness of 20 μm is achieved. The "shear rate of 10,000 $\sec^{-1}$" in the above-mentioned viscosity measurement conditions may be considered as a high shear condition. The shear viscosity $\eta_A$ of the uncured first aqueous coating film measured under a high shear condition particularly affects the surface condition of the first aqueous coating film when a droplet of the second aqueous coating composition (B) is applied. That is, the shear viscosity $\eta_A$ of the uncured first aqueous coating film greatly contributes to the appearance of a resulting multilayer coating film.

Regarding the shear viscosity $\eta_A$ of the uncured first aqueous coating film, the viscosity $\eta_{A1}$ measured under conditions of a temperature of 23° C. and a shear rate of 10,000 sec$^{-1}$ at a time of 3 minutes after applying the composition under a coating condition such that a dry film thickness of 20 μm is achieved, the viscosity $\eta_{A2}$ measured under conditions of a temperature of 23° C. and a shear rate of 10,000 sec$^{-1}$ at a time of 5 minutes after applying the composition under a coating condition such that a dry film thickness of 20 μm is achieved, and the viscosity $\eta_{A3}$ measured under conditions of a temperature of 23° C. and a shear rate of 10,000 sec$^{-1}$ at a time of 7 minutes after applying the composition under a coating condition such that a dry film thickness of 20 μm is achieved satisfy $$M_B V_B / \eta_{A1} < 3.0 \times 10^{-7}$$

$$M_B V_B / \eta_{A2} < 3.0 \times 10^{-7}$$

$$M_B V_B / \eta_{A3} < 3.0 \times 10^{-7}.$$

When all of the above $\eta_{A1}$, $\eta_{A2}$ and $\eta_{A3}$ satisfy the above ranges, there is an advantage that a better coating film appearance can be ensured.

The present invention is not an invention that focuses on a mixed layer that can be generated when the second aqueous coating composition (B) is applied onto the uncured first aqueous coating film. As described above, the present invention focuses on the effect of the surface state of the uncured first aqueous coating film when the droplets of the second aqueous coating composition (B) arrive on the appearance of the multilayer coating film.

In the above formula, the momentum of a droplet of the second aqueous coating composition (B) is used. However, it has been found that the kinetic energy of a droplet of the second aqueous coating composition (B) also affects the appearance of a resulting multilayer coating film.

(1) First Aqueous Coating Composition Application Step

In the above-described method for forming a multilayer coating film, first, the first aqueous coating composition (A) is applied to the surface of an article to form an uncured first aqueous coating film. The first aqueous coating composition (A) can be applied, for example, by using an air electrostatic spray commonly known as "react gun" or a rotary atomization type electrostatic coating machine commonly known as "Micro Microbell (μμ bell)", "Microbell (μ bell)", or "metallic bell (metabell).

"A state in which the first aqueous coating composition (A) or the second aqueous coating composition (B) is diluted to a coating viscosity" indicates a state in which each coating composition is adjusted to the coating viscosity. The coating viscosity is empirically determined in consideration of the above-mentioned atomization method of the electrostatic coating machine or factors of the coating environment such as temperature and humidity. Dilution is performed using water or an organic solvent as a dilution medium. Generally, when coating is performed in an environment where the temperature is 15° C. or higher and 40° C. or lower and the humidity is 10% or more and 98% or less, the coating viscosity is preferably 20 seconds or more and 90 seconds or less (/20° C., No. 4 Ford cup). When the coating viscosity is in this range, sagging, bubbles, pinholes, etc. are less likely to occur, and a good appearance can be easily obtained. The coating viscosity is more preferably 25 seconds or more and 80 seconds or less (/20° C., No. 4 Ford cup).

The application amount of the first aqueous coating composition (A) is preferably adjusted such that the dry film thickness of the first aqueous coating composition is 5 μm or more and 40 μm or less, preferably 10 μm or more and 30 μm or less.

In the above-described method for forming a multilayer coating film, the second aqueous coating composition (B) is applied without heating and curing the uncured first aqueous coating film, so that an uncured second aqueous coating film can be formed. The above-described method for forming a multilayer coating film has an advantage that wet-on-wet coating can be performed without preheating between the time of forming the uncured first aqueous coating film and the time of applying the second aqueous coating material.

In conventional wet-on-wet coating, a preheating step of drying an uncured first aqueous coating film by preliminarily heating is generally performed before applying a second aqueous coating material. The preheating step suppresses the water remaining in the uncured first aqueous coating film from bumping in the step of baking a multilayer coating film. Therefore, the generation of popping is also suppressed. Further, the preheating step suppresses the mixing of the uncured first aqueous coating film and the uncured second aqueous coating film, so that it becomes difficult to form a mixed layer. Therefore, the appearance of a resulting multilayer coating film is improved. In the preheating step, for example, drying is performed at a temperature of about 80° C. for 1 minute or more and 10 minutes or less.

In the method for forming a multilayer coating film of the present invention, satisfying the relationship represented by the above formula: $M_B V_B / \eta_A < 3.0 \times 10^{-7}$ affords an advantage that a multilayer coating film having a good appearance can be formed by performing so-called wet-on-wet coating without performing the above-mentioned preheating step. Therefore, it is possible to save energy and reduce $CO_2$ emissions in the application step. It also has the advantages of reducing the coating equipment cost and reducing the coating line space. Here, "without performing the preheating step" includes, for example, an embodiment where the first aqueous coating composition (A) is applied at room temperature (for example, 10° C. or higher and 30° C. or lower) and then the second aqueous coating composition (B) is applied within 0 to 30 minutes.

(2) Second Aqueous Coating Composition Application Step

The second aqueous coating composition (B) is applied onto the uncured first aqueous coating film obtained as described above to form an uncured second aqueous coating film. The second aqueous coating composition (B) can be applied, for example, by using an air electrostatic spray commonly known as "react gun" or a rotary atomization type electrostatic coating machine commonly known as "Micro Microbell (μμ bell)", "Microbell (μ bell)", or "metallic bell (metabell). The application amount of the second aqueous coating composition (B) is preferably adjusted such that the dry film thickness of the second aqueous coating film is 5 μm or more and 30 μm or less.

(3) Clear Coating Step

Next, a clear coating composition (C) is applied onto the resulting uncured second aqueous coating film to form an uncured clear coating film. The clear coating composition (C) can be applied by using a coating method according to its form. The application amount of the clear coating composition (C) is usually adjusted such that the film thickness of the clear coating film after curing is 10 μm or more and 70 μm or less. When the film thickness of the clear coating film after curing is within the above range, the appearance such as glossiness of the multilayer coating film is improved and the sharpness is improved. Further, defects such as unevenness and sagging during application can be easily suppressed. After forming the uncured second aqueous coating film, it is preferable to perform preheating at 40° C. or higher and 100° C. or lower for 2 minutes or more and 10 minutes or less. Thereby, a better appearance can be obtained.

(4) Curing Step

Next, the resulting uncured first aqueous coating film, uncured second aqueous coating film and uncured clear coating film are heat-cured. The heating is usually performed at 110° C. or higher and 180° C. or lower, preferably 120° C. or higher and 160° C. or lower. The heating time may be set arbitrarily according to the above-mentioned temperature. The heating time is, for example, 10 minutes or more and 60 minutes or less when the temperature is 120° C. or higher and 160° C. or lower.

The multilayer coating film obtained by the method for forming a multilayer coating film of the present invention has the advantages of having high smoothness and good appearance.

EXAMPLES

The present invention will be described hereafter in more detail by way of examples, to which the present invention is not intended to be limited. In the examples, "parts" and "%" are on a mass basis unless otherwise indicated.

Production Example 1

Production Example 1-1 Production of Acrylic Resin Emulsion

A reaction vessel for the conventional production of an acrylic resin emulsion equipped with a stirrer, a thermometer, a dropping funnel, a reflux condenser, a nitrogen inlet tube, etc., is charged with 445 parts of water and 5 parts of Newcol 293 (manufactured by Nippon Nyukazai Co., Ltd.), which were then heated to 75° C. with stirring. A mixture of a monomer mixture containing 145 parts of methyl methacrylate, 50 parts of styrene, 220 parts of ethyl acrylate, 70 parts of 2-hydroxyethyl methacrylate, and 15 parts of methacrylic acid, 240 parts of water, and 30 parts of Newcol 293 (manufactured by Nippon Nyukazai Co., Ltd.) was emulsified with a homogenizer, and thus a monomer pre-emulsified liquid was obtained. The monomer pre-emulsified liquid was added dropwise over 3 hours while stirring the inside of the reaction vessel. In parallel with the dropping of the monomer pre-emulsified liquid, an aqueous solution prepared by dissolving 1 part of APS (ammonium persulfate) as a polymerization initiator in 50 parts of water was evenly dropped to the reaction vessel until the dropping of the monomer pre-emulsified liquid was completed. After the completion of dropping the monomer pre-emulsified liquid, the reaction was continued at 80° C. for 1 hour. After cooling the reaction mixture, an aqueous solution prepared by dissolving 2 parts of dimethylaminoethanol in 20 parts of water was added to the reaction vessel, and thus an acrylic resin emulsion having a solid concentration of 40.6% by mass was obtained.

The solid component of the resulting acrylic resin emulsion had an acid value of 20 mg KOH/g, a hydroxyl value of 60 mg KOH/g, and a glass transition temperature (Tg) of 30° C. The solid concentration was measured in accordance with JIS K 5601-1-2 Method for Measuring Non-Volatile Matter Content.

Production Example 1-2 Production of Pigment-Dispersing Paste

Disperbyk 190 (nonion/anion dispersant manufactured by BYK-Chemie GmbH) (4.5 parts), 0.5 parts of BYK-011 (defoaming agent manufactured by BYK-Chemie), 22.9 parts of ion-exchanged water, and 72.1 parts of titanium dioxide was premixed. Then, in a paint conditioner, the premixed material was mixed and dispersed using a glass bead medium at room temperature until the particle size became 5 µm or less, affording a pigment-dispersing paste.

Production Example 1-3 Production of Water-Dispersible Polyester Resin

To a reactor, 25.6 parts of isophthalic acid, 22.8 parts of phthalic anhydride, 5.6 parts of adipic acid, 19.3 parts of trimethylolpropane, 26.7 parts of neopentyl glycol, 17.5 parts of ε-caprolactone, and 0.1 parts of dibutyltin oxide were added and then heated to 170° C. with mixing and stirring. Thereafter, while the reaction mixture was heated to 220° C. over 3 hours, the water produced by the condensation reaction was removed until the acid value reached 8. Next, 7.9 parts of trimellitic anhydride was added to the reactor and reacted at 150° C. for 1 hour, affording a polyester resin having an acid value of 40. Further, the polyester resin was cooled to 100° C., and then 11.2 parts of butylcellosolve was added, and the mixture was stirred until uniform. Subsequently, the polyester resin was cooled to 60° C., and then 98.8 parts of ion-exchanged water and 5.9 parts of dimethylethanolamine were added. As a result, a water-dispersible polyester resin having a solid content of 50% by mass was obtained. The solid component of the water-dispersible polyester resin had an acid value of 40 mg KOH/g, a hydroxyl value of 110 mg KOH/g, a number-average molecular weight of 2870, and a glass transition temperature (Tg) of −3° C. The glass transition temperature (Tg) was measured using a differential scanning calorimeter (DSC220C) manufactured by Seiko Instruments Inc. (SII). The measurement conditions were a sample weight of 10 mg, a heating rate of 10° C./min, and a measurement temperature of −20° C. to 100° C.

Preparation Example A

Preparation Example A-1 Preparation of First Aqueous Coating Composition (A-1)

The pigment-dispersing paste obtained in Production Example 1-2 (130.5 parts), 73.9 parts of the acrylic resin emulsion resin obtained in Production Example 1-1 (30 parts in terms of resin solid content), 60 parts of the water-dispersible polyester resin obtained in Production Example 1-3 (30 parts in terms of resin solid content), 100 parts of a water-dispersible polyurethane resin (manufactured by Nippon Paint Automotive Coatings Co., Ltd.) (20 parts in terms of resin solid content), and 22.2 parts of CYMEL 327 (melamine resin manufactured by Nihon Cytec Industries Inc.) as a curing agent were mixed. Then, 40 parts of ion-exchanged water was added to the mixture and further mixed. Subsequently, to the mixture was added 3.3 parts (corresponding to 1% by mass with respect to the resin solid content of the first aqueous coating composition) of Viscalex HV-30 (manufactured by BASF, polycarboxylic acid-based viscosity modifier, non-volatile content: 30%) as a viscosity modifier, followed by further mixing and stirring, and thus a first aqueous coating composition (A-1) was obtained.

Preparation Example A-2 Preparation of First Aqueous Coating Composition (A-2)

A first aqueous coating composition (A-2) was obtained in the same manner as in Preparation Example A-1 except that the water-dispersible polyurethane resin (manufactured by Nippon Paint Automotive Coatings Co., Ltd.) was not added.

Preparation Example A-3 Preparation of First Aqueous Coating Composition (A-3)

A first aqueous coating composition (A-3) was obtained in the same manner as in Preparation Example A-1 except that 2.2 parts of Viscalex HV-30 and 1.5 parts of DISPARLON AQ580 (polyamide-based viscosity modifier, active ingredient: 20%, manufactured by Kusumoto Chemicals, Ltd., trade name) were blended as viscosity modifiers.

Preparation Example A-4 Preparation of First Aqueous Coating Composition (A-4)

A first aqueous coating composition (A-4) was obtained in the same manner as in Preparation Example A-1 except that 2.2 parts of Viscalex HV-30 and 0.5 parts of ADEKA NOL UH-420 (urethane-based viscosity modifier, active ingredient: 30%, manufactured by ADEKA Corp., trade name) were blended as viscosity modifiers.

Preparation Example A-5 Preparation of First Aqueous Coating Composition (A-5)

A first aqueous coating composition (A-5) was obtained in the same manner as in Preparation Example A-1 except that 2.2 parts of Viscalex HV-30 and 2 parts of VISCALEX HV30 (polycarboxylic acid-based viscosity modifier, active ingredient: 30%, manufactured by KF Chemicals, Ltd., trade name) were blended as viscosity modifiers.

Preparation Example A-6 Preparation of First Aqueous Coating Composition (A-6)

A first aqueous coating composition (A-6) was obtained in the same manner as in Preparation Example A-1 except that 2.2 parts of Viscalex HV-30 and 0.29 parts of RHEOCRYSTA (cellulose-based viscosity modifier, cellulose nanofiber gel, manufactured by DKS Co. Ltd., solid content: 2%) were blended as viscosity modifiers.

Preparation Example A-7 Preparation of Aqueous Coating Composition (A-7)

The pigment-dispersing paste obtained in Production Example 1-2 (130.5 parts), 73.9 parts of the acrylic resin emulsion resin obtained in Production Example 1-1 (30 parts in terms of resin solid content), 100 parts of the water-dispersible polyester resin obtained in Production Example 1-3 (50 parts in terms of resin solid content), and 22.2 parts of CYMEL 327 (melamine resin manufactured by Nihon Cytec Industries Inc.) as a curing agent were mixed. Then, 100 parts of ion-exchanged water was mixed with the mixture. Subsequently, to the mixture was added 3.3 parts (corresponding to 1% by mass with respect to the resin solid content of the aqueous coating composition) of Viscalex HV-30 (polycarboxylic acid-based viscosity modifier manufactured by BASF, non-volatile content: 30%) as a viscosity modifier, followed by further mixing and stirring, and thus an aqueous coating composition (A-7) was obtained.

Production Example 2 Production of Water-Dispersible Acrylic Resin

A 2-liter reaction vessel equipped with a nitrogen inlet tube, a stirrer, a temperature controller, a dropping funnel, and a cooling tube was charged with 450 parts of propylene glycol ethyl ether, and the temperature was adjusted to 107° C. Next, 100 parts of acrylamide was dissolved in 200 parts of propylene glycol methyl ether, and 50 parts of styrene, 200 parts of 2-ethylhexyl methacrylate, 313 parts of n-butyl acrylate, 77 parts of methacrylic acid, and 260 parts of PLACCEL FM-1 (hydroxyl group-containing polymerizable monomer manufactured by Daicel Corporation), and 8 parts of t-butyl peroxy-2-hexanoate were mixed with the solution. In this way, a monomer solution was prepared separately. This monomer solution was added dropwise over 3 hours while stirring the inside of the reaction vessel. Then, stirring was continued for 30 minutes. Further, a mixed solution of 5 parts of t-butyl peroxy-2-hexanoate and 50 parts of propylene glycol methyl ether was added dropwise into the reaction vessel over 15 minutes. After that, stirring was continued for 1 hour. In this way, an acrylic resin having a resin solid content of 59% was obtained. The solid component of the acrylic resin had a number-average molecular weight of 13,000, a hydroxyl value of 60 mg KOH/g, and an acid value of 50 mg KOH/g.

The solvent was removed from the acrylic resin (500 parts) until the resin solid content became 75%. Then, 23.4 parts of dimethylethanolamine and 925 parts of ion-exchanged water were added, affording a water-dispersible acrylic resin having a resin solid content of 22%.

Preparation Example B

Preparation Example B-1 Preparation of Second Aqueous Coating Composition (B-1)

The water-dispersible acrylic resin obtained in Production Example 2 (273 parts) and 19 parts of an aluminum pigment paste "Aluminum Paste MH-8801" (manufactured by Asahi Kasei Corporation) were uniformly dispersed. Further, 50 parts of a melamine resin "CYMEL 202" (melamine resin manufactured by Nihon Cytec Industries Inc.) was added and uniformly dispersed, affording a metallic base coating composition (second aqueous coating composition).

Next, while stirring the metallic base coating composition with a disper, ethylene glycol monohexyl ether (commonly known as "hexylcellosolve", boiling point: 208° C., solubility: 0.99%) and Shellsol 71 (manufactured by Showa Shell, boiling point: 165-192° C., trade name) were gradually added. Then, ion-exchanged water was further added as a dilution medium to dilute the mixture to have a viscosity of 60 seconds (measured at 20° C. using a No. 4 Ford cup).

The resulting diluted second aqueous coating composition (B-1) had a solid content of 24% (volatile content: 76%), an ethylene glycol monohexyl ether content of 2%, and a Shellsol 71 content of 1.5%. The total organic solvent content of the second aqueous coating composition (B-1) was 11.0% by mass. The second aqueous coating composition (B-1) was uniform.

Preparation Example B-2 Preparation of Aqueous Coating Composition (B-2)

An aqueous coating composition (B-2) was prepared in the same manner as in Preparation Example B-1 except that ethylene glycol monohexyl ether and Shellsol 71 were not added.

Example 1 Formation of Multilayer Coating Film

A multilayer coating film was formed according to the following procedure using the first aqueous coating composition (A-1) and the second aqueous coating composition (B-1).
POWERNIX 110 (cationic electrodeposition coating material manufactured by Nippon Paint Automotive Coatings Co., Ltd.) was electrodeposited on a zinc phosphate-treated dull steel sheet such that the dry coating film had a thickness of 20 μm. Then, a cured electrodeposition coating film was formed by performing heat-curing at 160° C. for 30 minutes.
A first aqueous coating composition (A-1) was applied onto the cured electrodeposition coating film, affording an uncured first aqueous coating film. The application was performed by air spray coating at room temperature in an amount such that the dry film thickness was 20 μm. Then, the second aqueous coating composition (B-1) was applied without putting the item in a preheating oven. The application was performed by air spray coating using an electrostatic coating machine, RB-100WSC (manufactured by ABB Ltd.), in an amount such that the dry film thickness was 10 μm. The air speed and the amount of application were adjusted such that the droplet particle size shown in Table 1A was attained. Then, preheating was performed at 80° C. for 3 minutes. Further, MACFLOW O-1800W-2 clear (acid epoxy curable clear coating material manufactured by Nippon Paint Automotive Coatings Co., Ltd.) as a clear coating composition was applied to the coated sheet in a thickness of 35 μm by air spray coating. Subsequently, heat-curing was performed at 140° C. for 30 minutes, affording a specimen with a multilayer coating film.

The above-described first aqueous coating composition, second aqueous coating composition, and clear coating composition were diluted under the following conditions and used for application.
First Aqueous Coating Composition
Diluent: ion-exchanged water
40 seconds/NO.4 Ford cup/20° C.
Second Aqueous Coating Composition
Diluent: ion-exchanged water
45 seconds/NO.4 Ford cup/20° C.
The density of the diluted second aqueous coating composition was calculated based on the amounts of the respective components to be 1040 kg/m³.
Clear Coating Composition
Diluent: mixed solvent of EEP (ethoxyethyl propionate)/S-150 (aromatic hydrocarbon solvent manufactured by Exxon)=1/1 (mass ratio)
30 seconds/NO.4 Ford cup/20° C.

Example 2 Formation of Multilayer Coating Film

A multilayer coating film was formed in the same manner as in Example 1 using the first aqueous coating composition (A-2) and the second aqueous coating composition (B-1). The air speed and the amount of application were adjusted such that the droplet particle size shown in Table 1A was attained.

Example 3 Formation of Multilayer Coating Film

A multilayer coating film was formed in the same manner as in Example 1 using the first aqueous coating composition (A-li and the second aqueous coating composition (B-1). The air speed and the amount of application were adjusted such that the droplet particle size shown in Table 1A was attained.

Example 4 Formation of Multilayer Coating Film

A multilayer coating film was formed in the same manner as in Example 1 using the first aqueous coating composition (A-3) and the second aqueous coating composition (B-1). The airspeed and the amount of application were adjusted such that the droplet particle size shown in Table 1A was attained.

Example 5 Formation of Multilayer Coating Film

A multilayer coating film was formed in the same manner as in Example 1 using the first aqueous coating composition (A-4) and the second aqueous coating composition (B-1). The airspeed and the amount of application were adjusted such that the droplet particle size shown in Table 1A was attained.

Example 6 Formation of Multilayer Coating Film

A multilayer coating film was formed in the same manner as in Example 1 using the first aqueous coating composition (A-5) and the second aqueous coating composition (B-1). The airspeed and the amount of application were adjusted such that the droplet particle size shown in Table 1A was attained.

Example 7 Formation of Multilayer Coating Film

A multilayer coating film was formed in the same manner as in Example 1 using the first aqueous coating composition (A-6) and the second aqueous coating composition (B-1). The airspeed and the amount of application were adjusted such that the droplet particle size shown in Table 1A was attained.

Comparative Example 1 Formation of Multilayer Coating Film

A multilayer coating film was formed in the same manner as in Example 1 using the aqueous coating composition (A-7) and the second aqueous coating composition (B-1). The airspeed and the amount of application were adjusted such that the droplet particle size shown in Table 1B was attained.

Comparative Example 2 Formation of Multilayer Coating Film

A multilayer coating film was formed in the same manner as in Example 1 using the aqueous coating composition (A-7) and the aqueous coating composition (B-2). The air speed and the amount of application were adjusted such that the droplet particle size shown in Table 1B was attained.

Comparative Example 3 Formation of Multilayer Coating Film

A multilayer coating film was formed in the same manner as in Example 1 using the first aqueous coating composition (A-1) and the aqueous coating composition (B-2). The air speed and the amount of application were adjusted such that the droplet particle size shown in Table 1B was attained.

The following evaluations were performed using the specimens with a multilayer coating film obtained above. The evaluation results are shown in Tables 1A and 1B.

Evaluation of Coating Film Smoothness (SW Value)

Evaluation was performed by measuring SW (short wavelength, measurement wavelength: 300 to 1,200 μm) using a wave-scan DOI (manufactured by BYK Gardner) for the surface of an obtained multilayer coating film. The smaller the value, the better the smoothness.

Evaluation of Popping

The surface of an obtained multilayer coating film was visually observed. When no minute holes are confirmed in the coating film formed from the second aqueous coating composition (B-1) or the aqueous coating composition (B-2), this is evaluated as "good", whereas when minute holes are confirmed in the coating film formed by the second aqueous coating composition (B-1) or the aqueous coating composition (B-2) through a clear coating film, this is evaluated as "bad".

Measurement of Shear Viscosity (Pa·s) of Uncured First Aqueous Coating Film 5 Minutes after Application The first aqueous coating composition was applied onto the cured electrodeposition coating film at a room temperature of 23° C. in an amount such that the dry film thickness was 20 m. At the time of 5 minutes after the application, the viscosity of the first aqueous coating film was measured at 23° C. at a shear rate of 10,000/s using a viscometer (MCR-301) manufactured by Anton Paar GmbH.

Calculation of $M_B V_B$ at the Time of Applying Second Aqueous Coating Composition (B) to Uncured First Aqueous Coating Film The droplet particle size $m_B$ (μm) at the time of spray coating of the second aqueous coating composition (B) was measured from light scattering particle size distribution (volume basis) using SPRAYTEC (manufactured by Malvern), which is a laser diffraction type particle size distribution analyzer.

Using the determined droplet particle size $m_B$ (μm) and the density (1040 kg/m$^3$) of the second aqueous coating composition (B) at the time of its application, the momentum $M_B V_B$ and the kinetic energy $(1/2)M_B V_B^2$ of a droplet particle were calculated.

TABLE 1A

| | Example 1 | Example 2 | Example 3 | Example 4 | Example 5 | Example 6 | Example 7 |
|---|---|---|---|---|---|---|---|
| Evaluation of coating film smoothness (SW value) | 12 | 15 | 15 | 14 | 13 | 12 | 14 |
| Evaluation of popping | Good | Good | Good | Good | Good | Good | Good |
| Shear viscosity $\eta_A$ of uncured first aqueous coating film [Pa · s] | 0.06 | 0.011 | 0.057 | 0.048 | 0.062 | 0.065 | 0.061 |
| Droplet particle size $m_B$ [μm] | 17 | 18 | 106 | 105 | 102 | 87 | 97 |
| Momentum of droplet particle $M_B V_B$ [kg · m/s] | $1.4 \times 10^{-11}$ | $1.8 \times 10^{-11}$ | $5.2 \times 10^{-9}$ | $4.8 \times 10^{-9}$ | $4.8 \times 10^{-9}$ | $2.5 \times 10^{-9}$ | $4.0 \times 10^{-9}$ |
| $M_B V_B/\eta_A$ [(kg · m/s)/(Pa · s)] | $2.4 \times 10^{-10}$ | $1.6 \times 10^{-9}$ | $9.2 \times 10^{-8}$ | $1.0 \times 10^{-7}$ | $7.7 \times 10^{-8}$ | $3.9 \times 10^{-8}$ | $6.6 \times 10^{-8}$ |
| Kinetic energy of droplet particle $(1/2)M_B V_B^2$ [kg · (m/s)$^2$] | $3.5 \times 10^{-11}$ | $5.0 \times 10^{-11}$ | $2.1 \times 10^{-8}$ | $1.9 \times 10^{-8}$ | $2.0 \times 10^{-8}$ | $9.2 \times 10^{-9}$ | $1.7 \times 10^{-8}$ |
| $(1/2)M_B V_B^2/\eta_A$ [(kg · (m/s)$^2$)/(Pa · s)] | $5.9 \times 10^{-10}$ | $4.5 \times 10^{-9}$ | $3.7 \times 10^{-7}$ | $3.9 \times 10^{-7}$ | $3.2 \times 10^{-7}$ | $1.4 \times 10^{-7}$ | $2.7 \times 10^{-7}$ |

TABLE 1B

| | Comparative Example 1 | Comparative Example 2 | Comparative Example 3 |
|---|---|---|---|
| Evaluation of coating film smoothness (SW value) | 35 | 34 | 15 |
| Evaluation of popping | Good | Bad | Bad |
| Shear viscosity $\eta_A$ of uncured first aqueous coating film [Pa · s] | 0.01 | 0.011 | 0.059 |
| Droplet particle size $m_B$ [μm] | 100 | 103 | 99 |
| Momentum of droplet particle $M_B V_B$ [kg · m/s] | $3.8 \times 10^{-9}$ | $4.0 \times 10^{-9}$ | $4.2 \times 10^{-9}$ |
| $M_B V_B/\eta_A$ [(kg · m/s)/(Pa · s)] | $3.8 \times 10^{-7}$ | $3.6 \times 10^{-7}$ | $7.0 \times 10^{-8}$ |
| Kinetic energy of droplet particle $(1/2)M_B V_B^2$ [kg · (m/s)$^2$] | $1.3 \times 10^{-8}$ | $1.4 \times 10^{-8}$ | $1.6 \times 10^{-8}$ |
| $(1/2)M_B V_B^2/\eta_A$ [(kg · (m/s)$^2$)/(Pa · s)] | $1.3 \times 10^{-6}$ | $1.2 \times 10^{-6}$ | $2.8 \times 10^{-7}$ |

Examples 1 to 7 are examples in which the value of $M_B V_B/A$ satisfies the above range. These examples were confirmed to be superior in coating film smoothness.

Comparative Example 1 is an example in which the value of $M_B V_B/\eta_A$ does not satisfy the above range. This example was confirmed to be low in coating film smoothness.

Comparative Examples 2 and 3 are examples in which the second aqueous coating composition (B) contains neither the first nor the second organic solvent. These examples were also confirmed to be low in coating film smoothness.

Figure 1B:
FIG. 1B is a microscope image (observation direction 2) of a cross section of the boundary portion between the first coating film and the second coating film of the multilayer coating film formed in Example 1.

FIGS. 1A and 1B are a microscope image (observation direction 1) of a horizontal appearance surface of the multilayer coating film formed in Example 1 and a microscope image (observation direction 2) of a cross section of the boundary portion between the first coating film and the second coating film of the multilayer coating film, respectively.

Figure 2A:
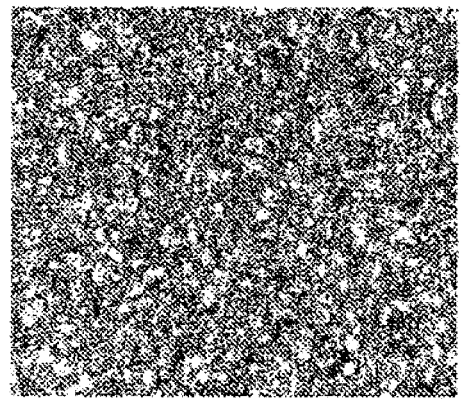
FIG. 2A is a microscope image (observation direction 1) of the horizontal appearance surface of the multilayer coating film formed in Example 4.
Figure 2B:
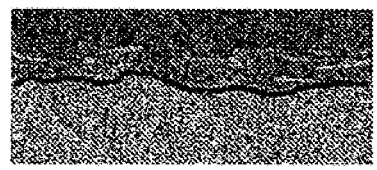
FIG. 2B is a microscope image (observation direction 2) of a cross section of the boundary portion between the first coating film and the second coating film of the multilayer coating film formed in Example 4.

FIGS. 2A and 2B are a microscope image (observation direction 1) of a horizontal appearance surface of the multilayer coating film formed in Example 4 and a microscope image (observation direction 2) of a cross section of the boundary portion between the first coating film and the second coating film of the multilayer coating film, respectively.

Figure 3A:
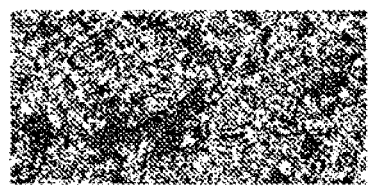
FIG. 3A is a microscope image (observation direction 1) of the horizontal appearance surface of the multilayer coating film formed in Comparative Example 1.
Figure 3B:
FIG. 3B is a microscope image (observation direction 2) of a cross section of the boundary portion between the first coating film and the second coating film of the multilayer coating film formed in Comparative Example 1.

FIGS. 3A and 3B are a microscope image (observation direction 1) of a horizontal appearance surface of the multilayer coating film formed in Comparative Example 1 and a microscope image (observation direction 2) of a cross section of the boundary portion between the first coating film and the second coating film of the multilayer coating film, respectively.

Figure 4:
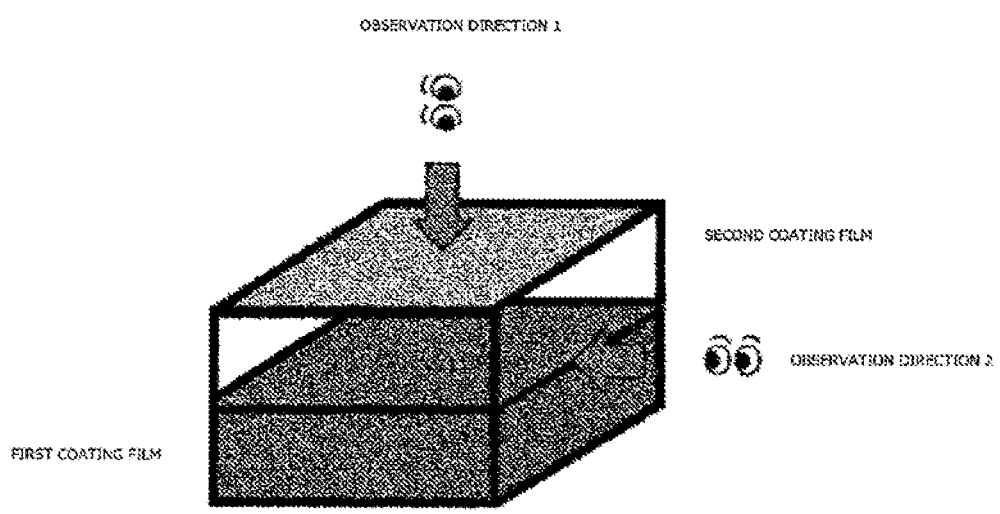
FIG. 4 is a schematic explanatory diagram showing the observation directions of the first coating film and the second coating film.

FIG. 4 is a schematic explanatory diagram showing the observation directions of the first coating film and the second coating film.

As shown in FIGS. 1A and 1B, the multilayer coating film formed in Example 1 had a uniform horizontal appearance and a uniform cross section. As shown in FIGS. 2A and 2B, the multilayer coating film formed in Example 4 had a uniform horizontal appearance and a uniform cross section. On the other hand, the multilayer coating film formed in Comparative Example 1 had a portion having a non-uniform horizontal appearance, and the cross section of the boundary portion between the first coating film and the second coating film was also disordered.

INDUSTRIAL APPLICABILITY

By use of the method of the present invention, it is possible to form a multilayer coating film having good coating film smoothness even when forming a second aqueous coating film without performing preheating after forming a first aqueous coating film. Therefore, there are industrial advantages, for example, it is possible to save energy and reduce $CO_2$ emissions in the application steps.

This application claims priority based on 62/854,523, which was provisionally filed in the United States on May 30, 2019, and Japanese Patent Application No. 2019-108195, which was filed in Japan on Jun. 10, 2019, the disclosure of which applications are incorporated herein by reference in their entirety.

The invention claimed is:

1. A method for forming a multilayer coating film, comprising:
a first aqueous coating composition application step of applying a first aqueous coating composition (A) to a surface of an article to form an uncured first aqueous coating film;
a second aqueous coating composition application step of applying a second aqueous coating composition (B) onto the uncured first aqueous coating film to form an uncured second aqueous coating film;
a clear coating step of applying a clear coating composition (C) onto the uncured second aqueous coating film to form an uncured clear coating film; and
a curing step of heat-curing at once the uncured first aqueous coating film, the uncured second aqueous coating film, and the uncured clear coating film in the steps defined above to form a multilayer coating film, wherein
the first aqueous coating composition (A) comprises a water-dispersible polyurethane resin (a1) and a viscosity modifier (a2),
the second aqueous coating composition (B) comprises water and an organic solvent as diluent components besides solid components in a state of dilution to a coating viscosity, and contains, as a part of the organic solvent, an organic solvent having a solubility in water of 0.1% or more and 7% or less, in an amount of 0.4% by mass or more and 5.0% by mass or less per the total amount of the coating material, and also contains an organic solvent insoluble in water in an amount of 0.05% by mass or more and 2.5% by mass or less per the total amount of the coating material, and
$M_B$, which is a droplet mass of the second aqueous coating composition (B) at the time of applying the composition to the uncured first aqueous coating film, $V_B$, which is a collision speed, and $\eta_A$, which is a shear viscosity of the uncured first aqueous coating film measured at a shear rate of 10,000 $\text{sec}^{-1}$, satisfy the following formula:

$$M_B V_B / \eta_A < 3.0 \times 10^{-7}.$$

2. The method for forming a multilayer coating film according to claim 1, wherein the second aqueous coating composition (B) is an aqueous coating composition comprising an acrylic resin emulsion and a melamine resin.

3. The method for forming a multilayer coating film according to claim 1, wherein
the organic solvent having a solubility in water of 0.1% or more and 7% or less contained in the second aqueous coating composition (B) is an organic solvent having a boiling point of 160° C. or higher and 280° C. or lower, and
the organic solvent insoluble in water is a hydrocarbon-based organic solvent having a boiling point of 145° C. or higher and 200° C. or lower.

4. The method for forming a multilayer coating film according to claim 1, wherein the shear viscosity ηA of the uncured first aqueous coating film is a viscosity $\eta_{A1}$ measured under the conditions of a temperature of 23° C. and a shear rate of 10,000 $\text{sec}^{-1}$ at the time of 3 minutes after the first aqueous coating composition (A) is applied under a coating condition such that a dry film thickness of 20 μm is achieved.

5. The method for forming a multilayer coating film according to claim 1, wherein the first aqueous coating composition (A) comprises the water-dispersible polyurethane resin (a1), the viscosity modifier (a2), a curing agent (a3), and an acrylic resin emulsion (a4).

6. The method for forming a multilayer coating film according to claim 1, wherein the viscosity modifier (a2) is one or more species selected from the group consisting of a polyamide-based viscosity modifier, a urethane-based viscosity modifier, a polycarboxylic acid-based viscosity modifier, a cellulose-based viscosity modifier, an inorganic layered compound-based viscosity modifier, and an aminoplast-based viscosity modifier.

7. The method for forming a multilayer coating film according to claim 1, wherein
regarding the shear viscosity $\eta_A$ of the uncured first aqueous coating film, the viscosity $\eta_{A1}$ measured under conditions of a temperature of 23° C. and a shear rate of 10,000 sec$^{-1}$ at a time of 3 minutes after applying the composition under a coating condition such that a dry film thickness of 20 µm is achieved, the viscosity $\eta_{A2}$ measured under conditions of a temperature of 23° C. and a shear rate of 10,000 sec$^{-1}$ at a time of 5 minutes after applying the composition under a coating condition such that a dry film thickness of 20 µm is achieved, and the viscosity $\eta_{A3}$ measured under conditions of a temperature of 23° C. and a shear rate of 10,000 sec$^{-1}$ at a time of 7 minutes after applying the composition under a coating condition such that a dry film thickness of 20 µm is achieved satisfy $$M_B V_B / \eta_{A1} < 3.0 \times 10^{-7}$$

$$M_B V_B / \eta_{A2} < 3.0 \times 10^{-7}$$

$$M_B V_B / \eta_{A3} < 3.0 \times 10^{-7}.$$

\* \* \* \* \*